United States Patent
Harada

(10) Patent No.: US 10,808,676 B2
(45) Date of Patent: Oct. 20, 2020

(54) METHOD FOR DETERMINING ARRANGEMENT POSITION OF VORTEX GENERATOR ON WIND TURBINE BLADE, METHOD FOR PRODUCING WIND TURBINE BLADE ASSEMBLY, AND WIND TURBINE BLADE ASSEMBLY

(71) Applicant: MITSUBISHI HEAVY INDUSTRIES, LTD., Tokyo (JP)

(72) Inventor: Motoshi Harada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 202 days.

(21) Appl. No.: 15/900,693

(22) Filed: Feb. 20, 2018

(65) Prior Publication Data

US 2019/0120205 A1 Apr. 25, 2019

(30) Foreign Application Priority Data

Oct. 20, 2017 (JP) ................................ 2017-203810

(51) Int. Cl.
*F03D 1/06* (2006.01)
(52) U.S. Cl.
CPC ......... *F03D 1/0633* (2013.01); *F03D 1/0641* (2013.01); *F05B 2240/32* (2013.01)
(58) Field of Classification Search
CPC .. F03D 1/0633; F03D 1/0641; F05B 2240/32; F05B 2240/122
See application file for complete search history.

(56) References Cited

U.S. PATENT DOCUMENTS

| 6,910,867 B2 * | 6/2005 | Corten | F03D 1/0641 416/223 R |
| 7,927,070 B2 * | 4/2011 | Godsk | F03D 1/0633 416/62 |

(Continued)

FOREIGN PATENT DOCUMENTS

| DE | 102013201871 A1 | 8/2014 |
| DK | 201770908 A * | 11/2018 |

(Continued)

OTHER PUBLICATIONS

"Wind Energy Math Calculations." https://www.yumpu.com/en/document/view/11309813/wind-energy-math-calculations-calculating-the-tip-speed-ratio-of- (Year: 2015).*

(Continued)

*Primary Examiner* — Michael Lebentritt
*Assistant Examiner* — Topaz L. Elliott
(74) *Attorney, Agent, or Firm* — Kanesaka Berner and Partners, LLP

(57) ABSTRACT

A wind turbine blade comprising a vortex generator including a plurality of fins. The plurality of fins include a first fin positioned closest to a blade tip, and the first fin is disposed closer to a blade root than a position closer to the blade tip, of a blade spanwise directional position at which a ratio t/C of a blade thickness 't' to a chord length C is 0.4 or a radial directional position of 0.2R with respect to a radius R of a rotor including the wind turbine blade. The vortex generator may include at least one fin disposed in a mounting range of zero to 0.1 R, such that a ratio x/C of a chordwise directional position x of the at least one fin to the chord length C satisfies $0 \leq x/C \leq 0.2$.

14 Claims, 14 Drawing Sheets

(56) References Cited

U.S. PATENT DOCUMENTS

| | | | | |
|---|---|---|---|---|
| 8,746,053 B2* | 6/2014 | Brake | F03D 1/0608 | |
| | | | 73/147 | |
| 8,801,387 B2* | 8/2014 | Fukami | F03D 1/0633 | |
| | | | 416/223 R | |
| 8,944,775 B2* | 2/2015 | Fuglsang | F03D 1/0641 | |
| | | | 416/237 | |
| 9,523,279 B2* | 12/2016 | Herr | F01D 5/12 | |
| 9,777,703 B2* | 10/2017 | Madsen | F03D 7/0244 | |
| 9,932,960 B2* | 4/2018 | Petsche | F03D 1/0683 | |
| 10,047,720 B2* | 8/2018 | Madsen | F03D 1/0641 | |
| 10,060,274 B2* | 8/2018 | Corten | F03D 1/0641 | |
| 10,100,808 B2* | 10/2018 | Erbsloh | F03D 1/0675 | |
| 10,330,077 B2* | 6/2019 | Fukami | F03D 1/0683 | |
| 10,443,562 B2* | 10/2019 | Corten | F03D 3/062 | |
| 10,443,563 B2* | 10/2019 | Fukami | F03D 1/0633 | |
| 2004/0013512 A1 | 1/2004 | Corten | | |
| 2008/0317600 A1* | 12/2008 | Enevoldsen | F03D 1/0641 | |
| | | | 416/223 R | |
| 2009/0285691 A1* | 11/2009 | Grabau | F03D 1/0633 | |
| | | | 416/223 R | |
| 2010/0209258 A1* | 8/2010 | Fuglsang | F03D 1/0641 | |
| | | | 416/90 R | |
| 2012/0257977 A1* | 10/2012 | Jensen | F03D 1/0608 | |
| | | | 416/223 R | |
| 2013/0094970 A1 | 4/2013 | Fukami | | |
| 2013/0183159 A1* | 7/2013 | Fukami | F03D 1/0633 | |
| | | | 416/223 R | |
| 2014/0219810 A1* | 8/2014 | Wurth | B64C 23/06 | |
| | | | 416/235 | |
| 2014/0328688 A1* | 11/2014 | Wilson | F01D 5/02 | |
| | | | 416/223 R | |
| 2015/0010407 A1* | 1/2015 | Zamora Rodriguez | | |
| | | | F03D 1/0641 | |
| | | | 416/236 R | |
| 2015/0159493 A1* | 6/2015 | Corten | F03D 1/0633 | |
| | | | 416/223 R | |
| 2015/0361952 A1 | 12/2015 | Petsche et al. | | |
| 2016/0047357 A1* | 2/2016 | Erbsloh | F03D 1/0675 | |
| | | | 416/244 R | |
| 2017/0138339 A1 | 5/2017 | Fukami | | |
| 2017/0138341 A1 | 5/2017 | Fukami | | |
| 2017/0218916 A1* | 8/2017 | Lehmann Madsen | | |
| | | | F03D 1/0641 | |
| 2017/0248116 A1* | 8/2017 | Fukami | F03D 1/0633 | |
| 2017/0248117 A1* | 8/2017 | Fukami | F03D 1/0683 | |
| 2018/0038341 A1* | 2/2018 | Fukami | F03D 9/25 | |
| 2018/0202417 A1* | 7/2018 | Fukami | F03D 1/0675 | |
| 2019/0003451 A1* | 1/2019 | Harada | F03D 1/0633 | |
| 2019/0010917 A1* | 1/2019 | Harada | F03D 1/0633 | |
| 2019/0120204 A1* | 4/2019 | Harada | F03D 1/0675 | |
| 2019/0226446 A1* | 7/2019 | Fukami | F03D 1/0633 | |
| 2019/0285046 A1* | 9/2019 | Doosttalab | F03D 1/0641 | |

FOREIGN PATENT DOCUMENTS

| | | | | |
|---|---|---|---|---|
| EP | 1944505 A1 | | 7/2008 | |
| EP | 2484898 A1 | | 8/2012 | |
| EP | 2548801 A1 * | | 1/2013 | F03D 1/0675 |
| EP | 2739529 A2 | | 6/2014 | |
| EP | 2824320 A1 | | 1/2015 | |
| EP | 2736805 B1 | | 6/2017 | |
| JP | 2017-89526 A | | 5/2017 | |
| JP | 2017-89561 A | | 5/2017 | |
| JP | 6154050 B1 | | 6/2017 | |
| JP | 2017-150447 A | | 8/2017 | |
| JP | 2017-150448 A | | 8/2017 | |
| JP | 2018-115559 A | | 7/2018 | |
| KR | 101454260 B1 * | | 10/2014 | |
| KR | 101454261 B1 * | | 10/2014 | |
| WO | WO-0116482 A1 * | | 3/2001 | F03D 1/0633 |
| WO | 2006/122547 A1 | | 11/2006 | |
| WO | WO-2009146810 A2 * | | 12/2009 | F03D 1/0675 |
| WO | 2013054404 A1 | | 4/2013 | |
| WO | WO-2013060722 A1 * | | 5/2013 | |
| WO | 2014/198353 A1 | | 12/2014 | |
| WO | 2015/030573 A1 | | 3/2015 | |

OTHER PUBLICATIONS

"Wind Turbine Power Calculations." The Royal Academy of Engineering. https://www.studocu.com/row/document/university-of-health-and-allied-sciences/membranes-and-receptors/lecture-notes/23-wind-turbine-2-lecture-notes-4/6484598/view (Year: 2018).*

Office Action for European Application No. 18158411.1 dated Apr. 1, 2019; 7pp.

Extended European Search Report in EP Application No. 18158411.1, dated Aug. 28, 2018, 7pp.

Summons to attend oral proceedings pursuant to Rule 115(1) EPC mailed on Nov. 11, 2019, issued to the corresponding EP Application No. 18158411.1; 4 pp.

Office Action for Japanese Application No. 2017-203810 dated Aug. 11, 2020; 10pp.

* cited by examiner

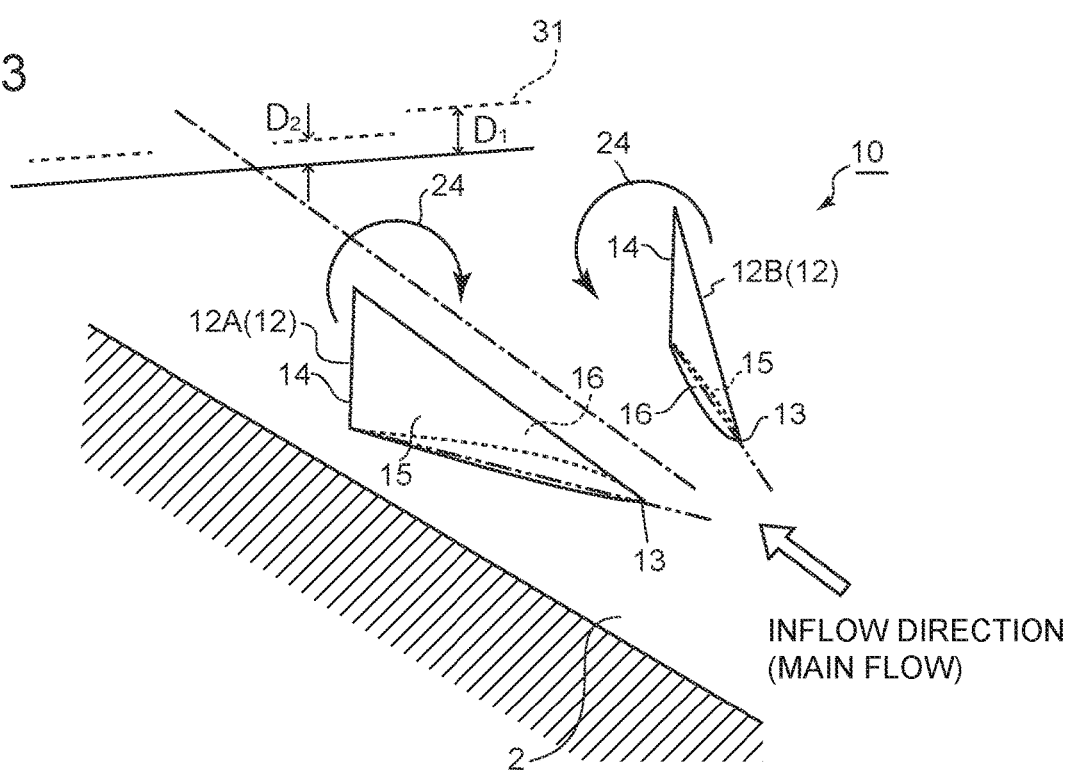

BLADE SPANWISE DIRECTION

METHOD FOR DETERMINING ARRANGEMENT POSITION OF VORTEX GENERATOR ON WIND TURBINE BLADE, METHOD FOR PRODUCING WIND TURBINE BLADE ASSEMBLY, AND WIND TURBINE BLADE ASSEMBLY

RELATED APPLICATIONS

The present application claims priority to Japanese Application Number 2017-203810, filed Oct. 20, 2017, the disclosure of which is hereby incorporated by reference herein in its entirety.

TECHNICAL FIELD

The present disclosure relates to a method for determining an arrangement position of a vortex generator on a wind turbine blade, a method for producing a wind turbine blade assembly, and a wind turbine blade assembly.

BACKGROUND ART

Approaches to improve aerodynamic performance of a wind turbine blade have been sought for some time to improve operation efficiency of a wind turbine. In one of the approaches, a vortex generator (VG) is disposed on a surface of a wind turbine blade to suppress separation of a flow along the surface of the wind turbine blade.

Patent Document 1 discloses a vortex generator having a platform portion to be mounted to a surface of a wind turbine blade, and a fin disposed upright on the platform portion.

CITATION LIST

Patent Literature

Patent Document 1: EP2736805A

SUMMARY

Meanwhile, in Patent Document 1, the position of the vortex generator on the blade tip side is set in a region of 0.2 to 0.5 L from the blade root side, with respect to the blade length L of the wind turbine blade. However, if the vortex generator is attached excessively, drag caused by the vortex generator, or drag penalty, may deteriorate the performance of the wind turbine blade. Thus, it is desirable to mount the vortex generator only to necessary locations. In this regard, a wind turbine blade in recent years has an improved aerodynamic performance and requires the vortex generator to be provided in a smaller region. Thus, mounting the vortex generator up to a region of 0.2 to 0.5 L is not always the best arrangement.

In view of the above, an object of at least one embodiment of the present invention is to suppress occurrence of drag penalty caused by mounting a vortex generator.

(1) A wind turbine blade according to at least one embodiment of the present invention comprises a vortex generator including a plurality of fins, wherein the plurality of fins include a first fin positioned closest to a blade tip, and the first fin is disposed closer to a blade root than a position closer to the blade tip, of a blade spanwise directional position at which a ratio t/C of a blade thickness 't' to a chord length C is 0.4 or a radial directional position of 0.2R with respect to a radius R of a rotor including the wind turbine blade.

As the size of a wind turbine blade increases, it is necessary to reduce the weight of the wind turbine blade. To reduce the weight of the wind turbine blade, it is effective to apply a great blade thickness ratio to the blade tip side of the wind turbine blade. As a result, the airfoil on the blade root side becomes relatively thin. In the region of 0.2R ($r/R \leq 0.2$) from the blade root of the above wind turbine blade, an airfoil having t/C of about 0.4 is applied. Separation is likely to occur in this region, for the wind inflow angle and the attack angle increase rapidly toward the blade root, and the blade thickness ratio is high. In this regard, with the above configuration (1), the mounting limit position of the first fin is set to be closer to the blade root than the position closer to the blade tip, of the blade spanwise directional position at which the blade thickness ratio t/C is 0.4, or the radial directional position of $r/R \leq 0.2$, which can be referred to as a region in which separation is likely to occur, and the vortex generator is disposed only at the blade-root side of the mounting limit position. Thus, it is possible to effectively suppress occurrence of drag penalty caused by mounting the vortex generator excessively, while enjoying the effect to suppress separation.

(2) In some embodiments, in the above configuration (1), the vortex generator includes at least one fin disposed in a mounting range of zero to 0.1 R, such that a ratio x/C of a chordwise directional position x of the at least one fin to the chord length C satisfies $0 \leq x/C \leq 0.2$.

With the above configuration (2), it is possible to position the blade-root side starting point of the vortex generator in a region of zero to 0.1R in the blade spanwise direction and $0 \leq x/C \leq 0.2$ in the chordwise direction. Accordingly, it is possible to obtain a wind turbine blade having the vortex generator capable of exerting the effect to reduce separation, in at least one of the rated wind velocity condition in the blade degradation state or the variable speed operation condition in the blade normal state.

(3) In some embodiments, in the above configuration (1) or (2), the vortex generator includes at least one fin disposed in a mounting range of 0.15 to 0.2R, such that a ratio x/C of a chordwise directional position x of the at least one fin to the chord length C satisfies $0.2 \leq x/C \leq 0.8$.

With the above configuration (3), it is possible to position the blade-tip side terminating point of the vortex generator in a region of 0.15 to 0.2R in the blade spanwise direction, and $0.2 \leq x/C \leq 0.8$ in the chordwise direction. Accordingly, it is possible to obtain the wind turbine blade having the vortex generator capable of exerting the effect to reduce separation, at least in the variable speed operation condition in the blade normal state.

(4) In some embodiments, in any one of the above configurations (1) to (3), the vortex generator may include a plurality of fin sets each of which is formed by a pair of fins each having a pressure surface and a suction surface, the fins being arranged such that the suction surfaces face each other. In the mounting range, a ratio Z/S of an arrangement pitch 'z' of two adjacent fin sets to an interval 's' between trailing edges of the pair of fins may satisfy $1.5 \leq Z/S \leq 3.0$.

To enhance the effect to suppress separation, it is desirable to arrange the vortex generator densely. On the other hand, to reduce drag, it is desirable to arrange the vortex generator less densely. Thus, as in the above configuration (4), by arranging the vortex generator with a density such that Z/S is not smaller than 1.5 and not greater than 3.0, it is possible to enjoy both of the effect to suppress separation and the effect to reduce drag at the same time.

(5) In some embodiments, in any one of the above configurations (1) to (4), the vortex generator may include a plurality of fin sets each of which is formed by a pair of fins arranged such that suction surfaces face each other, and a ratio S/H of an interval S between trailing edges of the pair of fins to a height H of the fins may satisfy 2.5≤S/H≤5.0.

As S/H decreases, the interval between the generated longitudinal vortices decreases, and mutual interference among the longitudinal vortices may cause reduction of the effect to suppress separation. In addition, an increased number of fins may increase drag of the vortex generator itself. On the other hand, as S/H increases, the interval between the generated longitudinal vortices increases. In this case, there are many locations without any longitudinal vortex in the mounting range of the vortex generator on the wind turbine blade, which may be a cause of reduction of the effect to suppress separation. Thus, as in the above (5), with S/H satisfying 2.5≤S/H≤5.0, it is possible to effectively enjoy the technical benefit from provision of the vortex generator.

(6) In some embodiments, in any one of the above configurations (1) to (5), the vortex generator may include a pair of fins arranged line-symmetrically with respect to a segment along a chordwise direction of the wind turbine blade.

With the above configuration (6), it is possible to arrange the vortex generator in an appropriate direction with respect to the inflow direction of wind, and to stabilize generation of vortices by the vortex generator.

(7) In some embodiments, in any one of the above configurations (1) to (6), the vortex generator may include a pair of fins arranged closer to the blade root than a starting point of a flat back of the wind turbine blade.

In a region close to the blade root, a flat back airfoil may be adopted to provide the trailing edge with a greater thickness, so as to suppress separation and maintain lift to a high attack angle. In contrast, in a region closer to the blade tip than the starting point of the flat back, separation is less likely to occur. If the vortex generator is arranged in this region, the demerit of occurrence of drag penalty may dominate. In this regard, with the above configuration (7), a pair of fins disposed closer to the blade root than the starting point of the flat back is included, and thus it is possible to effectively suppress occurrence of drag penalty caused by mounting the vortex generator excessively while enjoying the effect to suppress separation.

(8) In some embodiments, in any one of the above configurations (1) to (7), the vortex generator may include a plurality of fin sets each of which is formed by a pair of fins each having a pressure surface and a suction surface, the fins being arranged such that the suction surfaces face each other, and a ratio z/h of an arrangement pitch 'z' of the two adjacent fin sets to a height 'h' of the fins is not smaller than 6.0 and not greater than 8.0.

As described above (4), to enhance the effect to suppress separation, it is desirable to arrange the vortex generator densely. On the other hand, as the interval between adjacent fin sets decreases, the effect to suppress separation may reduce due to mutual interference among the generated longitudinal vortices. Thus, as in the above configuration (8), by arranging the vortex generator such that Z/H is not smaller than 6.0 and not greater than 8.0, it is possible to enjoy the effect to suppress separation and the effect to reduce drag at the same time.

(9) In some embodiments, in any one of the above configurations (1) to (8), a blade length L of the wind turbine blade satisfies L≥55 m.

With the arrangement of the vortex generator described in the above (1), a higher effect can be achieved if a wind turbine blade has a greater blade length. In this regard, with the above configuration (9), the wind turbine blade having a blade length L that satisfies L≥55 m can achieve the effect described in the above (1). Thus it is possible to suppress occurrence of drag penalty caused by mounting the vortex generator, for a wind turbine blade of a wind turbine of a relatively large size.

(10) In some embodiments, in any one of the above configurations (1) to (9), the vortex generator is disposed within a range where a blade thickness ratio is higher than $2 \times (t/c)_{ref}$, provided that $(t/c)_{ref}$ is a blade thickness ratio at a position where a ratio r/R of a blade spanwise directional position 'r' of the vortex generator to a radius R of the rotor is 0.8.

In recent years, it is necessary to reduce the weight of the wind turbine blade due to an increase in the size of the wind turbine blade. Thus, a greater blade thickness ratio may be applied to the blade tip side to adopt an airfoil in which the blade thickness ratio on the blade root side is relatively small. In such a case, provided that $(t/c)_{ref}$ is a blade thickness ratio at a position where r/R is 0.8, a region on the blade root side satisfying $2 \times (t/c)_{ref} \leq t/c$ may be regarded as a guide for the boundary of the region in which separation may occur. Thus, with the above configuration (10), it is possible to arrange the minimum vortex generator only in a region where separation is likely to occur, and thereby it is possible to effectively suppress occurrence of drag penalty caused by mounting the vortex generator excessively, while enjoying the effect to suppress separation.

(11) In some embodiments, in any one of the above configurations (1) to (10), the vortex generator is disposed in a range where a blade thickness ratio is not greater than $3 \times (t/c)_{ref}$, provided that $(t/c)_{ref}$ is a blade thickness ratio at a position where a ratio r/R of a blade spanwise directional position of the vortex generator to a radius R of the rotor is 0.8.

As described above, due to an increase in the size of the wind turbine blade, a greater blade thickness ratio may be applied to the blade tip side to adopt an airfoil in which the blade thickness ratio on the blade root side is relatively small. That is, the blade thickness ratio at r/R=0.2 with respect to the blade thickness ratio at r/R=0.8 in the wind turbine blade having an airfoil for a large wind turbine is smaller than that in a wind turbine blade having a typical airfoil (normally, about three times), and the region where the blade thickness ratio at r/R=0.2 is three times the blade thickness ratio at r/R=0.8 is a region on the side of the blade root satisfying r/R≤0.2, and can be regarded as a guide for the boundary of a region in which separation occurs. Thus, with the above configuration (11), it is possible to arrange the vortex generator only in a region where separation is likely to occur, and thereby it is possible to effectively suppress occurrence of drag penalty caused by mounting the vortex generator excessively, while enjoying the effect to suppress separation.

(12) A method for determining arrangement of a vortex generator including a plurality of fins on a wind turbine blade, according to at least one embodiment of the present invention, comprises: determining arrangement of the plurality of fins such that a first fin positioned closest to a blade tip, of the plurality of fins, is disposed closer to a blade root than a position closer to the blade tip, of a blade spanwise directional position at which a ratio t/C of a blade thickness to a chord length C is 0.4 or a radial directional position of 0.2R with respect to a radius R of a rotor including the wind turbine blade.

According to the above method (12), as described above in (1), it is possible to determine the mounting limit position of the first fin to be closer to the blade root than the position closer to the blade tip, of the blade spanwise directional position at which the blade thickness ratio t/C is 0.4, or the radial directional position of r/R≤0.2, which can be referred to as a guide for a region in which separation is likely to occur, and the vortex generator 10 is disposed only at the blade-root side of the mounting limit position. Thus, it is possible to effectively suppress occurrence of drag penalty caused by mounting the vortex generator excessively, while enjoying the effect to suppress separation.

(13) A method for determining arrangement of a vortex generator on a wind turbine blade, according to at least one embodiment of the present invention, comprises: a first step of determining arrangement of the vortex generator at an angular position offset by a predetermined angle toward a trailing edge of the wind turbine blade, with reference to an inflow angle of wind to the wind turbine blade, in a first region, in a blade spanwise direction, of a mounting range of the vortex generator on the wind turbine blade; a second step of determining an arrangement position of the vortex generator between a separation position of a flow on a surface of the wind turbine blade under a rated wind speed condition and a transition position of a flow on the surface of the wind turbine blade under a variable speed operation condition of a wind turbine which includes the wind turbine blade, in a second region closer to a blade tip than the first region, of the mounting range; and a third step of determining the arrangement position of the vortex generator by connecting arrangements in the first step and the second step.

According to the above method (13), in the first step, it is possible to set the starting point of the arrangement of the vortex generator in the first region on the side of the blade root, at a position offset by a predetermined angle toward the trailing edge with reference to the inflow angle of wind. Furthermore, with the second step, it is possible to determine the terminating point of the arrangement of the vortex generator on the side of the blade tip at a position between the separation position of a flow on the surface of the wind turbine blade under a rated wind speed condition and the transition position of a flow on the surface of the wind turbine blade under a variable speed operation condition of a wind turbine including the wind turbine blade. Then, the arrangement is determined in the third step so as to connect the respective arrangements of the vortex generator determined in the first step and the second step, and thereby it is possible to arrange the vortex generator easily at a position where the vortex generator can exert its effect under both of the rated wind speed condition in the blade degradation state and the variable speed operation condition in the blade normal state.

(14) A method for producing a wind turbine blade assembly, according to at least one embodiment of the present invention, comprises a step of arranging the vortex generator on the wind turbine blade, according to any one of the above (1) to (11).

With the above configuration (14), it is possible to obtain a wind turbine blade assembly provided with the vortex generator having the effect described in any one of the above (1) to (11).

According to some embodiments of the present invention, it is possible to suppress occurrence of drag penalty caused by mounting a vortex generator.

BRIEF DESCRIPTION OF DRAWINGS

FIG. 3 is a perspective view for describing a flow around the fin of a vortex generator according to an embodiment.

FIG. 14A is a graph showing a relationship between upstream wind velocity and rotation speed of a wind turbine. FIG. 14B is a graph showing a relationship between upstream wind velocity and tip speed ratio. FIG. 14C is a graph showing a relationship between upstream wind velocity and wind turbine output. FIG. 14D is a graph showing a relationship between upstream wind velocity and attack angle.

FIG. 15A is a diagram showing a transition position and a separation position under a variable speed operation condition. FIG. 15B is a diagram showing a transition position and a separation position under a variable speed operation condition.

FIG. 18A is a cross-sectional view of the blade root side, and FIG. 18B is a cross-sectional view of the blade tip side.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
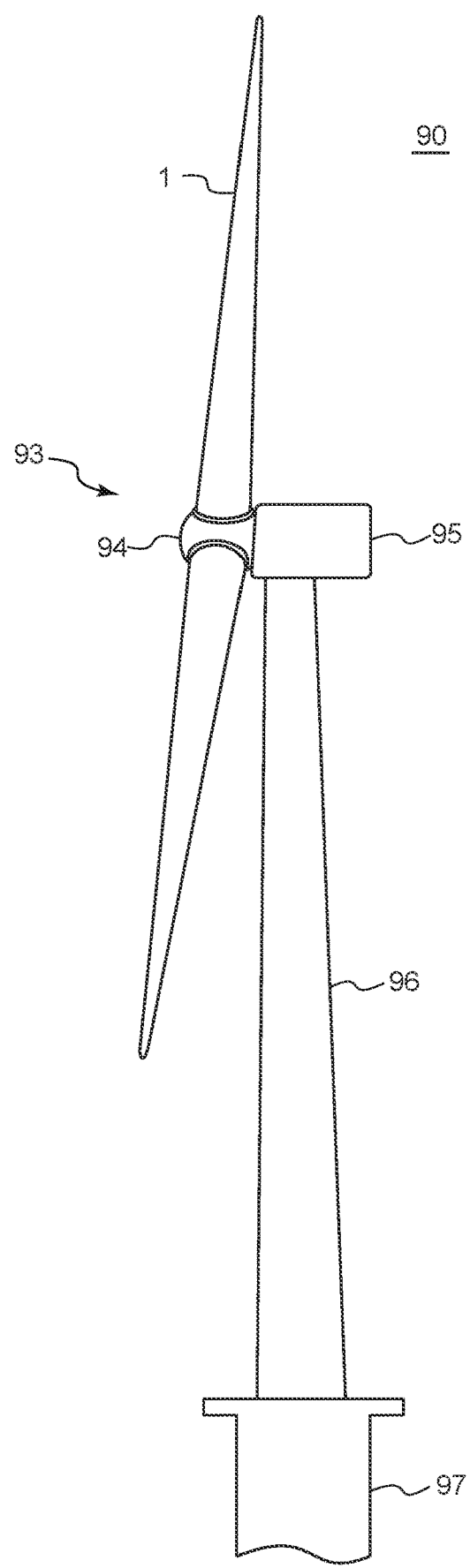
FIG. 1 is a schematic configuration diagram of a wind turbine power generating apparatus according to an embodiment.
Figure 2A:
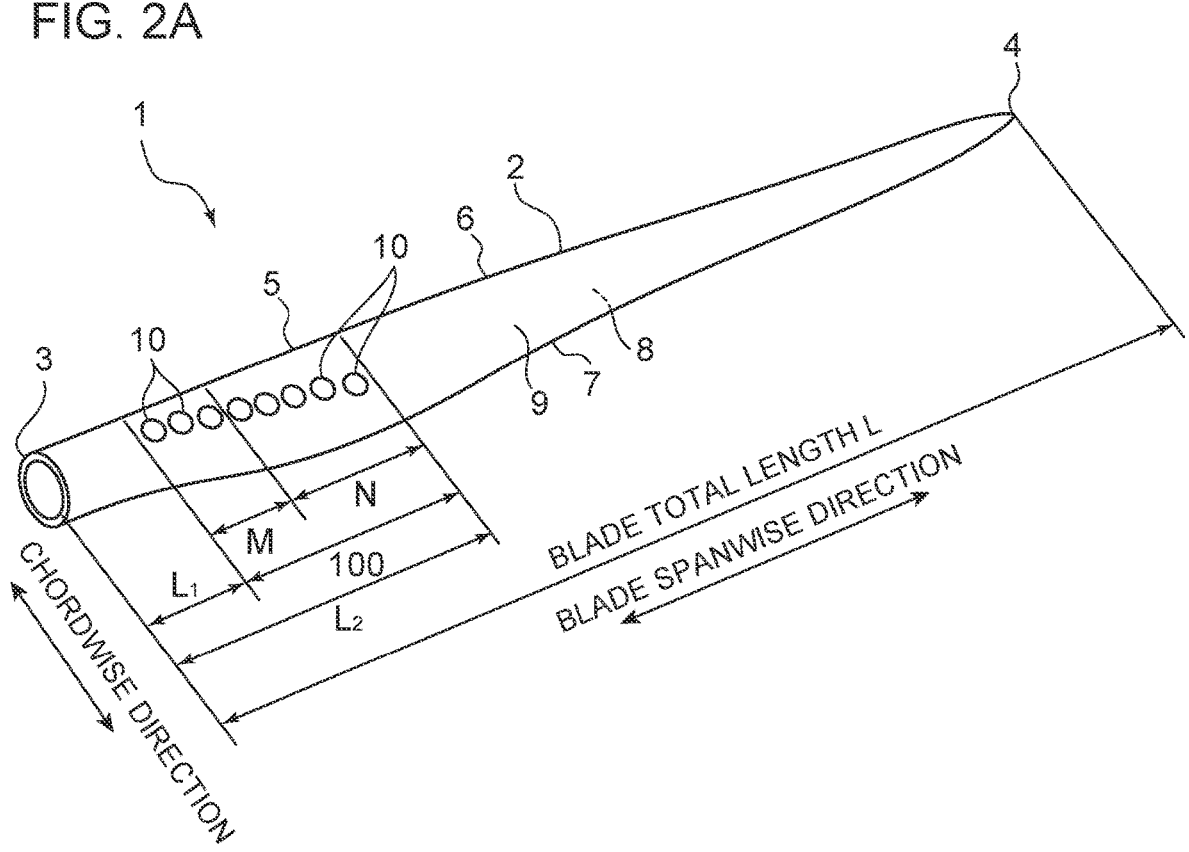
FIG. 2A is a perspective view of a wind turbine blade assembly according to an embodiment.

With reference to FIGS. 1 and 2A, overall configuration of a wind turbine blade and a wind turbine power generating apparatus to which a vortex generator according to some embodiments is to be applied will be described. FIG. 1 is a schematic configuration diagram of a wind turbine power generating apparatus according to an embodiment. FIG. 2A is a perspective view of a wind turbine blade to which a method for determining an arrangement position of a vortex generator according to an embodiment is to be applied.

As shown in FIG. 1, a wind turbine power generating apparatus 90 includes at least one (e.g. three) wind turbine blade assemblies 1. The wind turbine blade assemblies 1 include a wind turbine blade 2 and a vortex generator 10. The wind turbine blade assemblies 1 are mounted to a hub 94 in a radial fashion, and the wind turbine blade assemblies 1 and the hub 94 constitute a rotor 93 of the wind turbine power generating apparatus 90. The rotor 93 rotates in response to wind received by the wind turbine blade assemblies 1, and a generator (not depicted) coupled to the rotor 93 generates electric power.

In the embodiment depicted in FIG. 1, the rotor 93 is supported by a nacelle 95 disposed on an upper part of a tower 96. The tower 96 is disposed to stand upright on a base structure 97 (e.g. foundation structure or floating structure) disposed on water or on land.

As described below, according to a method for determining an arrangement position of a vortex generator according to an embodiment, a vortex generator 10 is mounted to the wind turbine blade 2 of the wind turbine assemblies 1, in the wind turbine power generating apparatus 90 having the above configuration.

As shown in FIG. 2A, the wind turbine blade assembly 1 includes a wind turbine blade 2. According to a method for determining an arrangement position according to an embodiment, the vortex generator 10 is arranged on the surface (blade surface) of the wind turbine blade 2. In FIG. 2A, the vortex generator 10 is already mounted to the wind turbine blade assembly 1.

The wind turbine blade 2 includes a blade root 3 to be attached to the hub 94 of the wind turbine power generating apparatus 90, a blade tip 4 positioned farthest from the hub 94, and an airfoil part 5 extending between the blade root 3 and the blade tip 4. The wind turbine blade 2 has a leading edge 6 and a trailing edge 7 from the blade root 3 to the blade tip 4. Further, an exterior shape of the wind turbine blade 2 is formed by a pressure surface 8 and a suction surface 9 disposed opposite to the pressure surface 8.

As shown in FIG. 2A, in the wind turbine blade assembly 1, a plurality of the vortex generators 10 are mounted to the suction surface 9 of the wind turbine blade 2. Furthermore, the plurality of vortex generators 10 are mounted to the suction surface 9 of the wind turbine blade 2 in a blade spanwise direction.

Hereinafter, "blade spanwise direction" refers to a direction connecting the blade root 3 and the blade tip 4, and "blade chordwise direction" refers to a direction along a line (chord) connecting the leading edge 6 and the trailing edge 7 of the wind turbine blade 2 (hereinafter, also referred to as merely chordwise direction).

An aerodynamic function of the vortex generator 10 will now be described briefly. FIG. 3 is a perspective view for describing function of the vortex generator 10. In FIG. 3, only a pair of adjacent fins 12A, 12B is depicted, from among a fin row (a plurality of pairs of fins 12A, 12B) formed by arranging a plurality of vortex generators 10 shown in FIGS. 4 and 5 described below, in the blade spanwise direction of the wind turbine blade 2.

Separation of a flow at the suction surface 9 of the wind turbine blade 2 takes place due to a boundary layer becoming gradually thicker from a streamline flow region in the vicinity of the leading edge 6 toward a turbulent flow region downstream thereof, and the flow being separated before arriving at the trailing edge 7.

As shown in FIG. 3, the vortex generator 10 mounted to the wind turbine blade 2 normally generates a longitudinal vortex 24 on the side of the suction surface 16 of the fin 12 with a lift produced by the fin 12. The longitudinal vortex 24 promotes momentum exchange between outside and inside of a boundary layer 31 at a wake-flow side of the fin 12. Accordingly, in the region between the suction surfaces 16 of the adjacent fins 12, the thickness D of the boundary layer 31 of wake of the fins 12 decreases. Thus, with the plurality of fins 12 arranged in the blade spanwise direction, the boundary layer 31 at the surface of the wind turbine blade 2 becomes thin as a whole, which suppresses trailing edge separation of the wind turbine blade 2.

It should be noted that longitudinal vortices 24 refer to vortices formed in the height direction of the fins 12.

Figure 4:
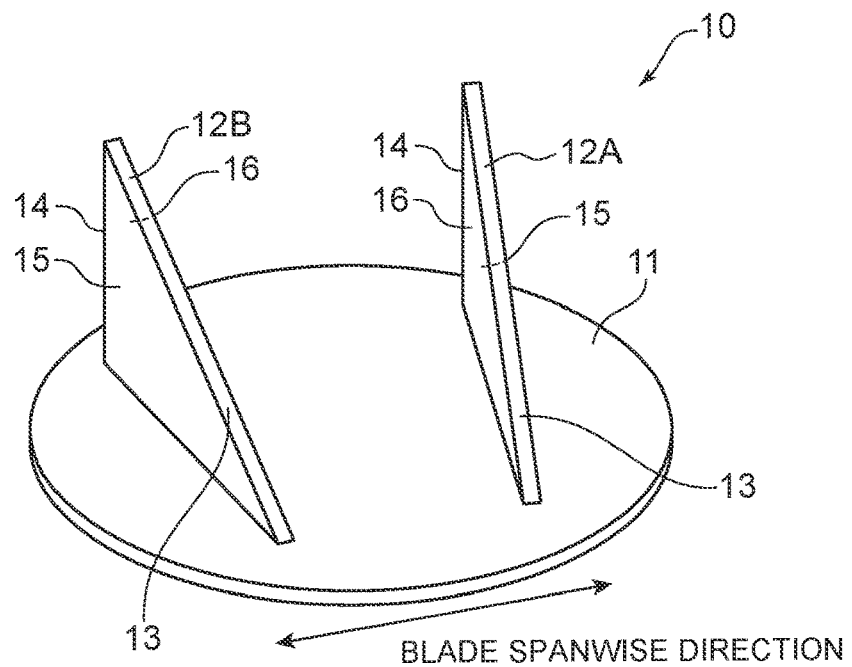
FIG. 4 is a perspective view of a vortex generator according to an embodiment.
Figure 5:
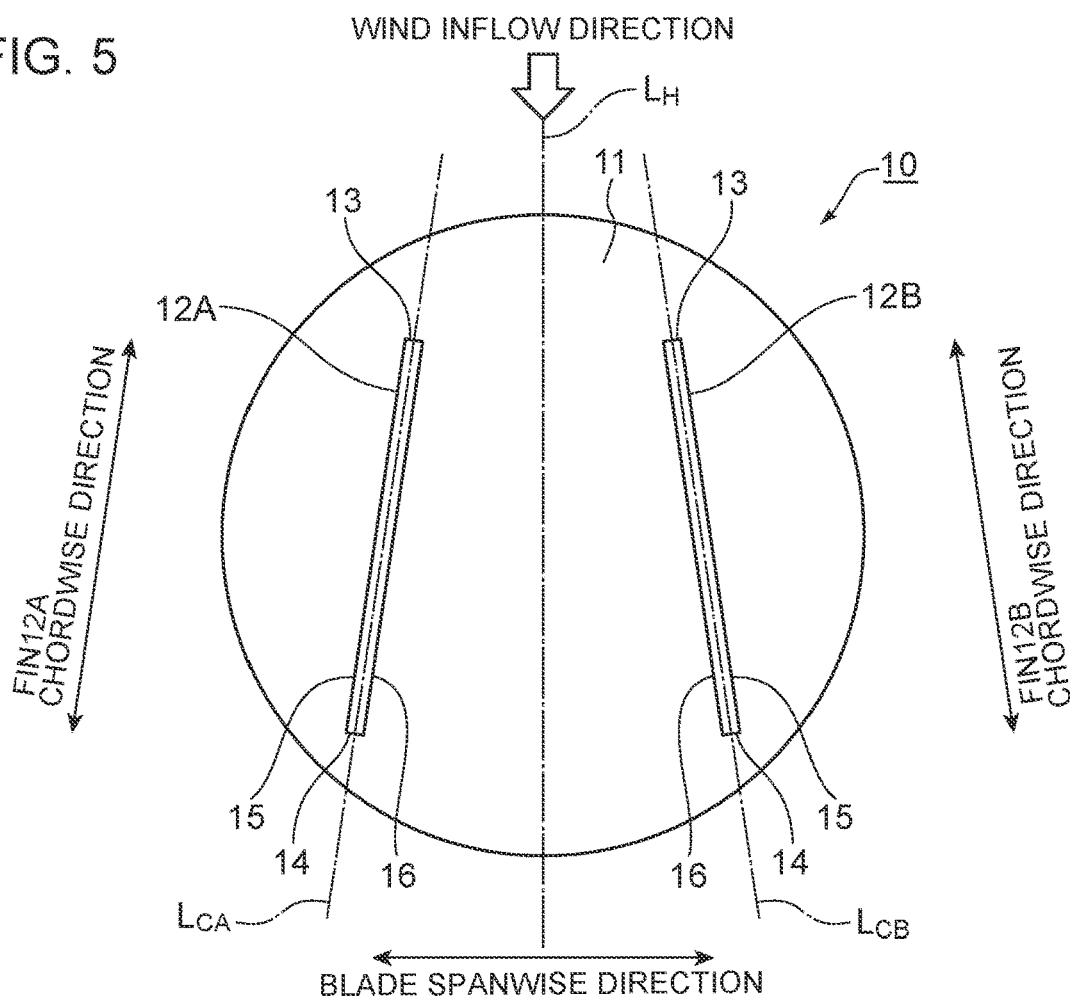
FIG. 5 is a top view of a vortex generator according to an embodiment.
Figure 6:
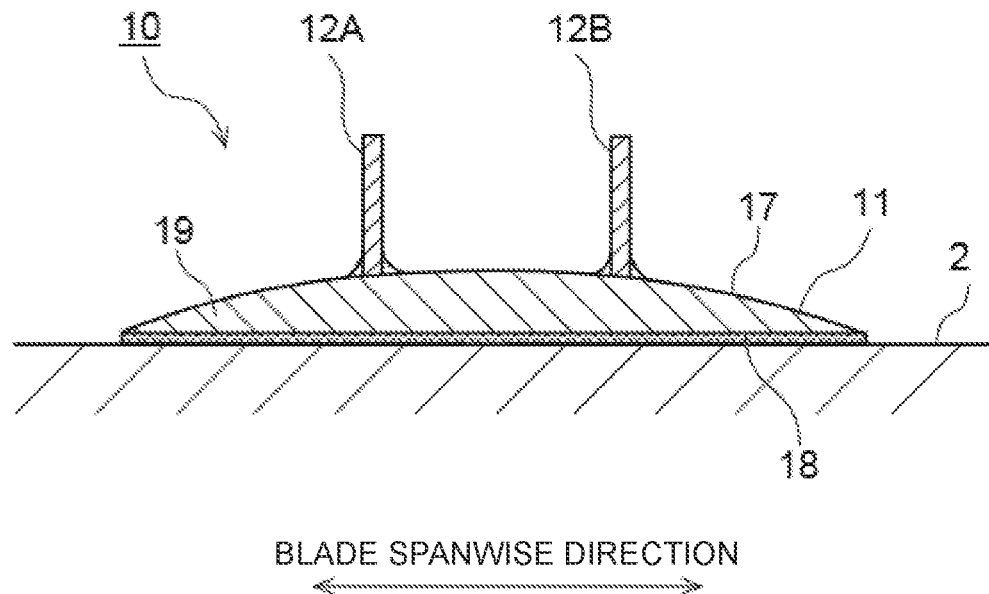
FIG. 6 is a cross-sectional view of a vortex generator according to an embodiment, taken along the blade spanwise direction.
Figure 7:
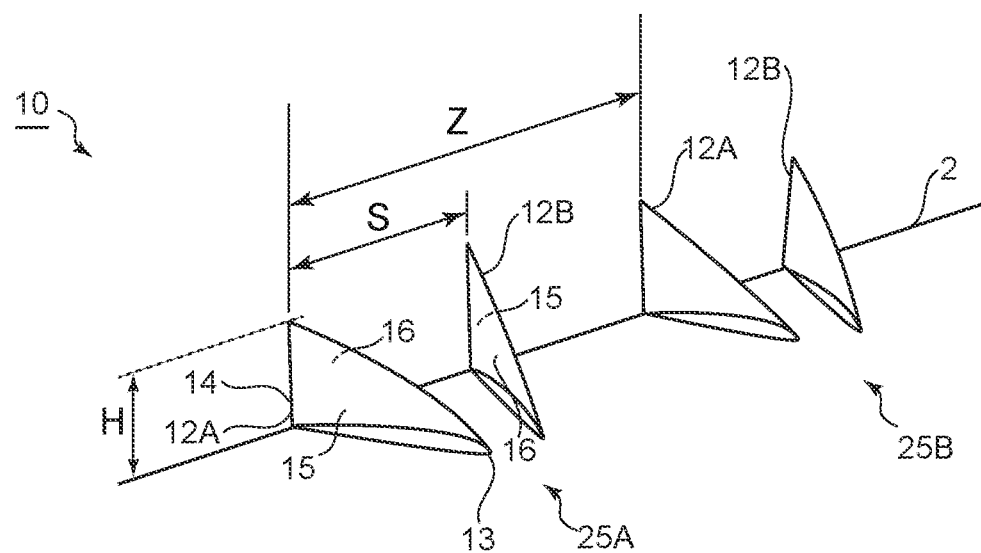
FIG. 7 is a perspective view of a vortex generator according to an embodiment.

Next, the configuration the vortex generator 10 will be described in detail with reference to FIGS. 4 to 7. FIG. 4 is a perspective view of a vortex generator according to an embodiment. FIG. 5 is a top view of a vortex generator according to an embodiment. FIG. 6 is a cross-sectional view of a vortex generator according to an embodiment, taken along the blade spanwise direction. FIG. 7 is a perspective view of a vortex generator according to an embodiment.

As shown in FIG. 4, the vortex generator 10 according to some embodiments includes a platform portion 11 fixed to a surface of the wind turbine 2 (more specifically, to a surface of the blade body 2) and at least one fin 12 disposed upright on the platform portion 11. In the embodiment shown in FIGS. 4 to 6, the vortex generator 10 includes a pair (two in total) of fins 12 (12A, 12B) disposed so as to be adjacent to each other on the platform portion 11.

In the embodiment shown in FIGS. 4 and 5, the platform portion 11 has a circular shape in a top view.

In some embodiments, the platform portion 11 may have a shape other than a circular shape. For instance, the platform portion 11 may have an oval shape, or a polygonal shape such as a rectangular shape.

Furthermore, as shown in FIG. 7 as an example, in some embodiments, the vortex generator 10 may not necessarily include the platform portion 11, and the fin 12 may be directly mounted to the wind turbine blade 2.

In some embodiments, as shown in FIG. 5, the fin 12 is disposed on the wind turbine blade 2 such that the extension lines $LC_A$ and $LC_B$ of the fin chords form a predetermined angle with the line $L_H$ along the chordwise direction of the wind turbine blade 2.

In FIG. 5, each of the fins 12A, 12B is disposed so that the gap between the pair of fins 12A, 12B widens from upstream toward downstream with respect to the inflow direction of wind (i.e., from the side of the leading edge 6 toward the side of the trailing edge 7 of the wind turbine blade 2 (see FIG. 2), in a state where the vortex generator 10 is being mounted to the wind turbine blade 2).

In some embodiments, each of the fins 12A, 12B may be disposed so that a gap between the pair of fins 12A, 12B widens from downstream toward upstream with respect to the inflow direction of wind (i.e., from the side of the trailing edge 7 toward the side of the leading edge 6 of the wind turbine blade 2 (see FIG. 2) in a state where the vortex generator 10 is mounted to the wind turbine blade 2).

Furthermore, in an embodiment, the fins 12 may be disposed on the wind turbine blade 2 such that the line $L_H$ along the chordwise direction of the wind turbine blade 2 bisects the angle formed by the extension lines $L_{CA}$ and $L_{CB}$ of a pair of fin chords. In some embodiments, the vortex generator 10 may include a pair of fins 12 disposed line-symmetrically with respect to a segment along the chordwise direction C of the wind turbine blade 2.

As described above, with reference to the chord of the wind turbine blade 2 along the wind inflow direction, the vortex generator 10 is arranged at an angle with respect to the fin chord. Accordingly, it is possible to mount the vortex generator 10 to the wind turbine blade 2 in a mounting direction suitable to enhance the effect to suppress separation, with respect to the wind inflow direction.

In FIG. 6, depicted is a cross section 19 of the platform portion 11 of the vortex generator 10 taken along the blade spanwise direction. As shown in FIG. 6, in the vortex generator 10 according to some embodiments, the platform portion 11 has a front surface 17 exposed to outside, and a back surface 18 opposite to the front surface of the wind turbine blade 2. As shown in FIG. 6, in some embodiments, the vortex generator 10 is arranged on the wind turbine blade 2 while being oriented such that the cross sectional shape of the platform portion 11 has a curved convex shape along the blade spanwise direction.

Herein, "curved convex shape" refers to a shape that bulges in a direction away from the wind turbine blade 2 to have, at least partially, a bulged portion with a curved profile (the shape of the front surface 17 of the platform portion 11).

The profile of the bulged portion may be formed by an arc having a single curvature radius as in the embodiment depicted in FIG. 6, or may be formed by combination of a plurality of arcs having different curvature radii, or combination of arcs having one or more curvature radii and one or more straight lines, in another non-depicted embodiment.

During operation of the wind turbine power generating apparatus 90, the wind turbine blade 2 deforms flexurally due to bending deformation caused by an aerodynamic load. Thus, a great stress is applied to the platform portion 11 of the vortex generator 10 mounted to the surface of the wind turbine blade 2. In this regard, with the above embodiment, the platform portion 11 of the vortex generator 10 has a cross section of a curved convex shape along the blade spanwise direction of the wind turbine blade 2, and thereby the platform portion is deformable in accordance with bending deformation of the wind turbine blade 2, which makes it possible to disperse stress generated at the platform portion 11.

FIG. 7 is a perspective view of the vortex generator 10 mounted to the wind turbine blade 2. As shown in FIG. 7, the vortex generator 10 according to some embodiments includes a plurality of fin sets 25 each formed by a pair of fins (12A, 12B), the fins each having a pressure surface 15 and a suction surface 16 and being arranged such that the respective suction surfaces 16 face each other. In some embodiments, the vortex generator 10 is arranged such that a ratio Z/S of the arrangement pitch 'z' of the adjacent fin sets (25A, 25B) to the interval 's' of the trailing edges 14 of the pair of fins (12A, 12B) is not smaller than 1.5 and not greater than 3.0.

To enhance the effect to suppress separation, it is desirable to arrange the vortex generator 10 densely. On the other hand, to reduce drag, it is desirable to arrange the vortex generators 10 less densely. Thus, by arranging the vortex generators 10 with a density such that Z/S is not smaller than 1.5 and not greater than 3.0 as described above, it is possible to achieve both of the effect to suppress separation and the effect to reduce drag at the same time.

In some embodiments, a ratio S/H of the interval 's' between the trailing edges of a pair of fins 12 to the height 'h' of the fins 12 satisfies 2.5≤S/H≤5.0 (see FIG. 7).

S/H is a value related to the distance between the trailing edges of a pair of fins 12. As S/H decreases, the distance between longitudinal vortices 29 generated on the side of the trailing edges 14 of the fins 12 also decreases. Thus, the longitudinal vortices 29 may interfere with each other, thereby reducing the effect to suppress separation. In addition, as S/H decreases, the number of the fins 12 in the mounting region of the vortex generator 10 on the wind turbine blade 2 increases. Thus, the drag of the vortex generator 10 itself increases, which may cause occurrence of drag penalty. On the other hand, as the S/H increases, the interval between the generated longitudinal vortices 29 increases. In this case, there are many locations without any longitudinal vortex 29 in the mounting range of the vortex generator 10 on the wind turbine blade 2, which may be a cause of reduction of the effect to suppress separation. Accordingly, with S/H satisfying 2.5≤S/H≤5.0 in the present embodiment, it is possible to effectively enjoy the technical benefit from provision of the vortex generator 10.

Figure 8:
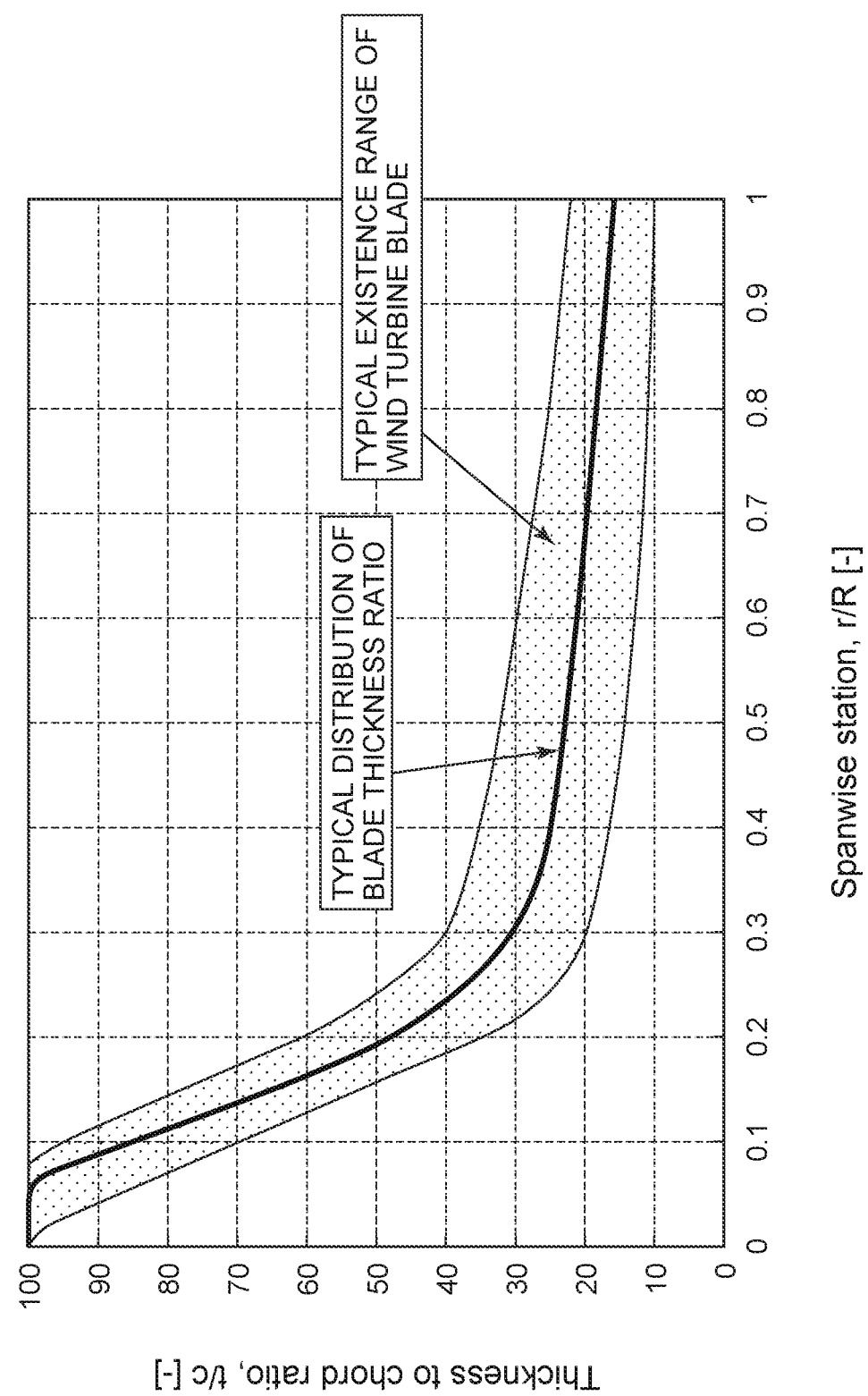
FIG. 8 is a graph showing a relationship between the radial directional position and the blade thickness ratio of a typical wind turbine blade.

Herein, the wind turbine blade 2 according to at least one embodiment of the present invention is a wind turbine blade 2 provided with the vortex generator 10 including a plurality of fins 12. The first fin 12A positioned closest to the blade tip 4, of the plurality of fins 12, is disposed closer to the blade root 3, than the position closer to the blade tip 4, of the blade spanwise directional position at which a ratio t/C of the blade thickness 't' to the chord length C is 0.4 or the radial directional position of 0.2R with respect to the radius R of the wind turbine rotor 93 including the wind turbine blade 2 (see FIG. 8).

As the size of the wind turbine blade 2 increases, it is necessary to reduce the weight of the wind turbine blade 2. To reduce the weight of the wind turbine blade 2, it is effective to apply a great blade thickness ratio (t/C) to the side of the blade tip 4 of the wind turbine blade 2. As a result, the airfoil on the side of the blade root 3 becomes relatively thin. In the region of 0.2R (r/R≤0.2) from the blade root 3 of the above wind turbine blade 2, an airfoil having t/C of about 0.4 is applied. Separation is likely to occur in this region, for the inflow angle of wind and attack angle wind increase rapidly toward the blade root 3, and the blade thickness ratio is high. In this regard, with the above configuration, the mounting limit position of the first fin 12A is set to be closer to the blade root 3 than the position closer to the blade tip 4, of the blade spanwise directional position at which the blade thickness ratio t/C is 0.4, or the radial directional position of r/R≤0.2, which can be referred as a guide for a region in which separation is likely to occur, and the vortex generator 10 is disposed only in a region closer to the blade root 3 than the mounting limit position. Thus, it is possible to effectively suppress occurrence of drag penalty caused by mounting the vortex generator 10 excessively while exerting the effect to suppress separation. In some embodiments, the first fin 12A may be arranged in a region of 0.18R (r/R≤0.18) from the side of the blade root 3 (see FIG. 9).

Figure 9:
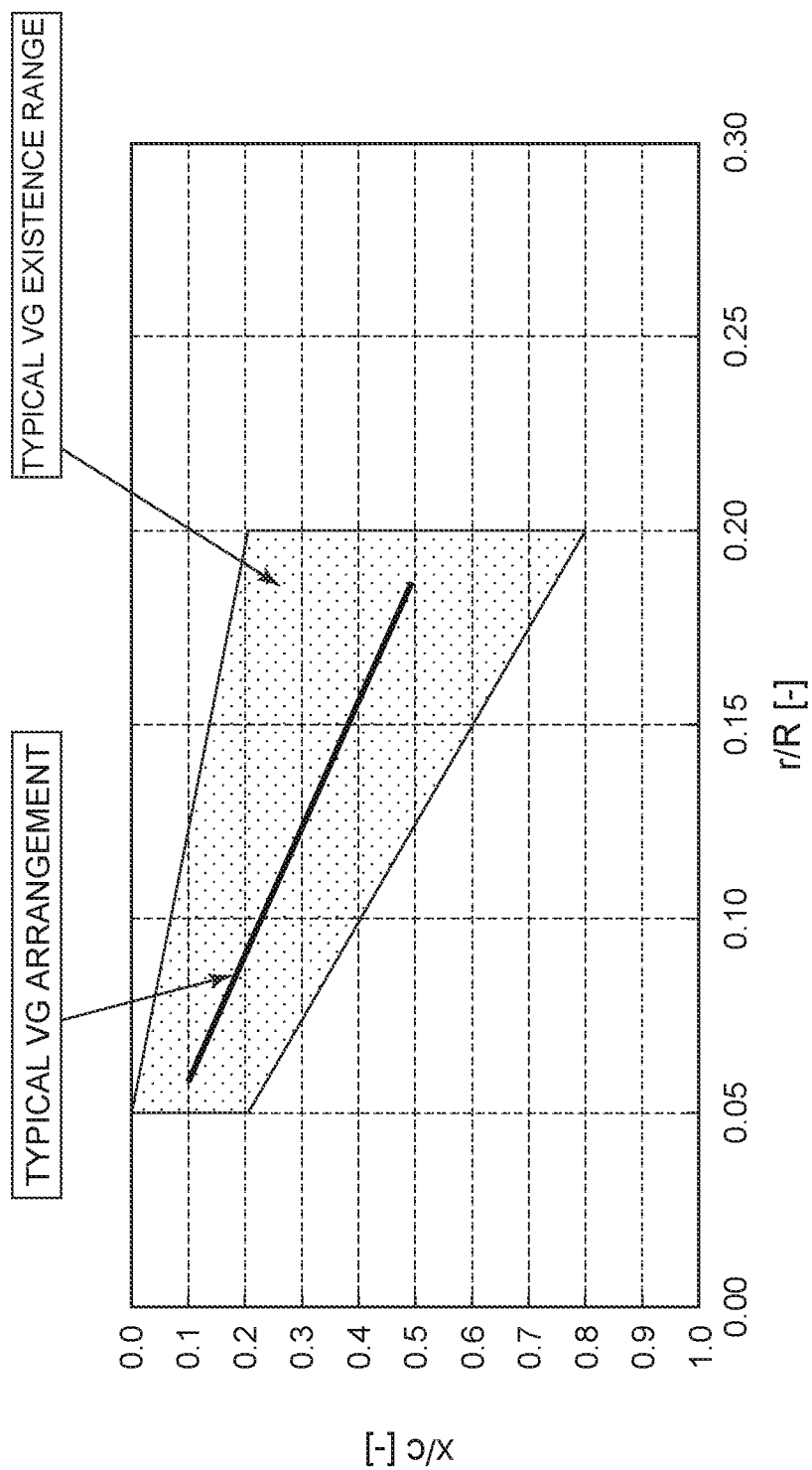
FIG. 9 is a graph showing a distribution of the blade spanwise directional position and the chordwise directional position of a typical vortex generator.
Figure 10:
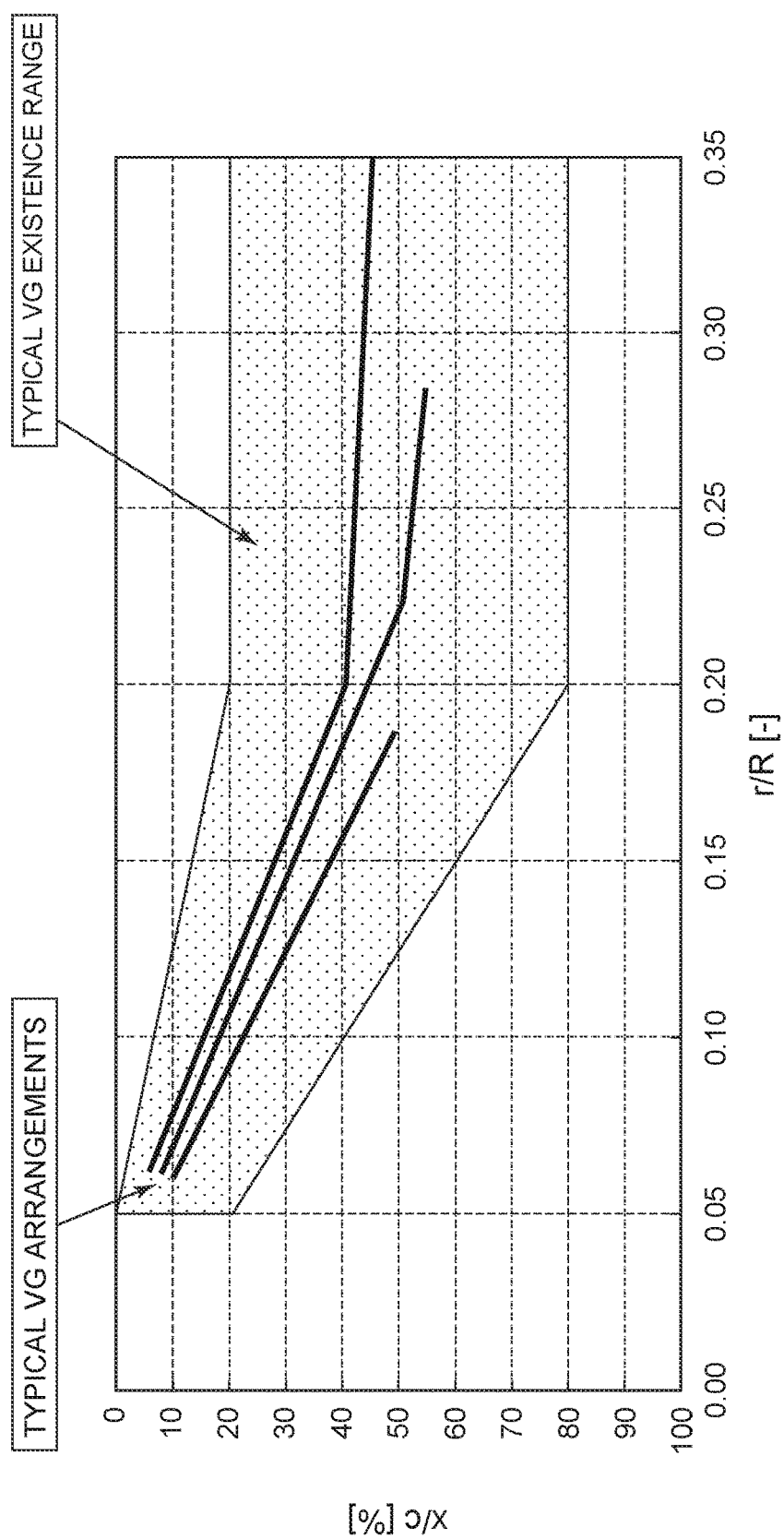
FIG. 10 is a graph showing a distribution of the blade spanwise directional position and the chordwise directional position of a typical vortex generator.

In some embodiments, as shown in FIGS. 9 and 10 for instance, the vortex generator 10 may include one or more fins 12 disposed in a range of 0 to 0.1R, such that the ratio x/C of the chordwise directional position x to the chord length C satisfies 0≤x/C≤0.2.

With the above configuration, it is possible to position the starting point of the vortex generator 10 at the side of the blade root 3 in a region of zero to 0.1R in the blade spanwise direction and 0≤x/C≤0.2 in the chordwise direction. Accordingly, it is possible to obtain the wind turbine blade 2 having the vortex generator 10 capable of enjoying the effect to reduce separation, in at least one of the rated wind velocity condition in the blade degradation state or the variable speed operation condition in the blade normal state.

Furthermore, in some embodiments, the vortex generator 10 may include one or more fins 12 disposed in a range of 0.15 to 0.2R, such that the ratio x/C of the chordwise directional position x to the chord length C satisfies 0.2≤x/C≤0.8 (see FIGS. 9 and 10).

With the above configuration, it is possible to position the terminating point of the vortex generator 10 at the side of the blade tip 4 in a region of 0.15 to 0.2R in the blade spanwise direction and 0.2≤x/C≤0.8 in the chordwise direction. Accordingly, it is possible to obtain the wind turbine blade 2 having the vortex generator 10 capable of enjoying the effect to reduce separation, at least in the variable speed operation condition in the blade normal state.

Figure 11:
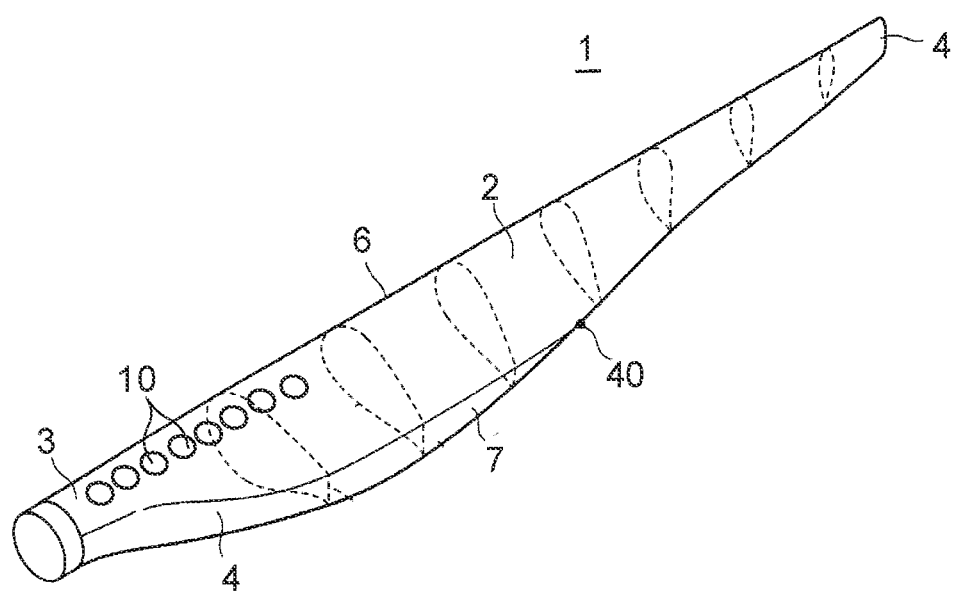
FIG. 11 is a perspective view of a wind turbine blade according to an embodiment.

In some embodiments, in any one of the above configurations, the vortex generator 10 may include a pair of fins 12 disposed closer to the blade root 3 than the starting point 40 of the flat back of the wind turbine blade 2 (see FIG. 11).

In a region close to the blade root 3, a flat back airfoil may be adopted to provide the trailing edge 7 with a greater thickness, so as to suppress separation and maintain lift to a high attack angle. In contrast, separation is less likely to occur in a region closer to the blade tip 4 than the starting point 40 of the flat back. If the vortex generator 10 is arranged in this region, the demerit of occurrence of drag penalty may dominate. In this regard, with the above configuration, a pair of fins 12 disposed closer to the blade root 3 than the starting point of the flat back is included, and thus it is possible to effectively suppress occurrence of drag penalty caused by mounting the vortex generator 10 excessively while enjoying the effect to suppress separation.

In some embodiments, in any one of the above configuration, the blade length L of the wind turbine blade 2 may satisfy L≥55 m (see FIG. 2).

With the arrangement of the vortex generator described in the above (1), a higher effect can be achieved with a wind turbine blade with a greater blade length. In this regard, with the above configuration (9), in the wind turbine blade having a blade length L that satisfies L≥55 m, it is possible to achieve the effect described in the above (1). Thus, for a wind turbine blade of a wind turbine of a relatively large size, it is possible to suppress occurrence of drag penalty caused by mounting the vortex generator.

In some embodiments, as shown in FIG. 9 for example, the vortex generator 10 may be disposed within a range of the blade thickness ratio higher than $2 \times (t/c)_{ref}$, provided $(t/c)_{ref}$ is a blade thickness ratio at a position where a ratio of the blade spanwise directional position 'r' of the vortex generator 10 to the radius R of the wind turbine rotor 93 0.8.

In recent years, it is necessary to reduce the weight of the wind turbine blade 2 due to an increase in the size of the wind turbine blade 2. Thus, a greater blade thickness ratio may be applied to the side of the blade tip 4 to adopt an airfoil in which the blade thickness ratio on the side of the blade root 3 is relatively small. In such a case, provided that $(t/c)_{ref}$ is a blade thickness ratio at a position where r/R is 0.8, a region on the blade root side satisfying $2 \times (t/c)_{ref} \leq t/c$ may be regarded as a guide for the boundary of the region in which separation may occur. Thus, with the above configuration, it is possible to arrange minimum vortex generator 10 only in a region where separation is likely to occur, and thereby it is possible to effectively suppress occurrence of drag penalty caused by mounting the vortex generator 10 excessively while exerting the effect to suppress separation.

In some embodiments, as shown in FIG. 9 for example, the vortex generator 10 is disposed within a range of the blade thickness ratio not greater than $3 \times (t/c)_{ref}$, provided that $(t/c)_{ref}$ is a blade thickness ratio at a position where a ratio r/R of the blade spanwise directional position 'r' to the radius R of the wind turbine rotor 93 is 0.8.

As described above, with an increase in the size of the wind turbine blade 2, a greater blade thickness ratio may be applied to the side of the blade tip 4 to adopt an airfoil in which the blade thickness ratio on the side of the blade root 3 is relatively small. That is, the blade thickness ratio at r/R=0.2 with respect to the blade thickness ratio at r/R=0.8 in the wind turbine blade 2 having an airfoil for a large wind turbine is smaller than that in a wind turbine blade 2 having a typical airfoil (normally, about three times), and the region where the blade thickness ratio at r/R=2 is three times the blade thickness ratio at r/R=0.8 is a region on the side of the blade root 3 satisfying r/R≤0.2, and can be regarded as a guide for the boundary of a region in which separation occurs. Thus, with the above configuration, it is possible to arrange the vortex generator 10 only in a region where separation is likely to occur, and thereby it is possible to effectively suppress occurrence of drag penalty caused by mounting the vortex generator 10 excessively, while exerting the effect to suppress separation.

Herein, a method for determining arrangement of the vortex generator 10 to the wind turbine blade 2 according to an embodiment is a method for determining arrangement of the vortex generator 10 to the wind turbine blade 2 provided with the vortex generator 10 including the plurality of fins 12. The method comprises determining arrangement of the plurality of fins 12, such that the first fin 12A positioned closest to the blade tip 4, of the plurality of fins 12, is disposed closer to the blade root 3, than the position closer to the blade tip 4, of the blade spanwise directional position at which a ratio t/C of the blade thickness to the chord length C is 0.4 or the radial directional position of 0.2R with respect to the radius R of the wind turbine rotor 93 including the wind turbine blade 2.

According to this method, as described above, it is possible to determine the mounting limit position of the first fin 12A to be closer to the blade root 3 than the position closer to the blade tip 4, of the blade spanwise directional position at which the blade thickness ratio t/C is 0.4, or the radial directional position of r/R≤0.2, which is a region in which separation is likely to occur, and the vortex generator 10 can be disposed only in a region closer to the blade root 3 than the mounting limit position. Thus, it is possible to effectively suppress occurrence of drag penalty caused by mounting the vortex generator 10 excessively, while enjoying the effect to suppress separation.

According to at least one embodiment of the present invention, a method for determining arrangement of the vortex generator 10 to the wind turbine blade 2 includes: determining arrangement of the vortex generator to an angular position offset by a predetermined angle toward the trailing edge 7 of the wind turbine blade 2 with reference to an inflow angle of wind to the wind turbine blade 2, in the first region M in the blade spanwise direction L, of the mounting range of the vortex generator 10 to the wind turbine blade 2 (first step); determining an arrangement position of the vortex generator 10 between a separation position of a flow on the surface of the wind turbine blade 2 under a rated wind velocity condition and the transition position of a flow on the surface of the wind turbine blade 2 under a variable speed operation condition of a wind turbine including the wind turbine blade 2 (second step); and determining an arrangement condition of the vortex generator 10 by connecting the arrangements in the first step and the second step (third step).

According to this method, in the first step, it is possible to set the starting point of the arrangement of the vortex generator 10 in the first region M on the side of the blade root 3, at a position offset by a predetermined angle toward the trailing edge 7 with reference to the inflow angle of wind. Furthermore, with the second step, it is possible to determine the terminating point of the arrangement of the vortex generator 10 on the side of the blade tip 4 at a position between the separation position of a flow on the surface of the wind turbine blade 2 under a rated wind speed condition and the transition position of a flow on the surface of the wind turbine blade 2 under a variable operation condition of a wind turbine including the wind turbine blade 2. Then, the arrangement is determined in the third step so as to connect the respective arrangements of the vortex generator 10 determined in the first step and the second step, and thereby it is possible to arrange the vortex generator 10 easily at a position where the vortex generator 10 can exert its effect under both of the rated wind speed condition in the blade degradation state and the variable speed operation condition in the blade normal state.

A method for producing the wind turbine blade assembly 1 according to at least one embodiment of the present invention includes a step of arranging the vortex generator 10 on the wind turbine blade 2 according to any one of the above.

According to this method, it is possible to obtain the wind turbine blade assembly 1 provided with the vortex generator 10 having the effect described in any one of the above.

Furthermore, a method for determining the arrangement of a vortex generator on a wind turbine blade according to at least one embodiment of the present invention is a method for determining the arrangement of the vortex generator on a wind turbine blade described in any one of the above, wherein the vortex generator 10 includes a plurality of fin sets each of which is formed by a pair of fins 12 arranged such that the suction surfaces 9 face each other, and the ratio Z/H of the arrangement pitch 'z' of adjacent two fin sets to the height 'h' of the pair of fins 12 is not smaller than 6.0 and not greater than 8.0.

As described above, to enhance the effect to suppress separation, it is desirable to arrange the vortex generators 10 densely. On the other hand, as the interval between adjacent fin sets decreases, the effect to suppress separation may reduce due to mutual interference among the generated longitudinal vortices. Thus, by arranging the vortex generator 10 so that Z/H is not smaller than 6.0 and not greater than 8.0, it is possible to enjoy the effect to suppress separation and the effect to reduce drag at the same time.

Figure 12:
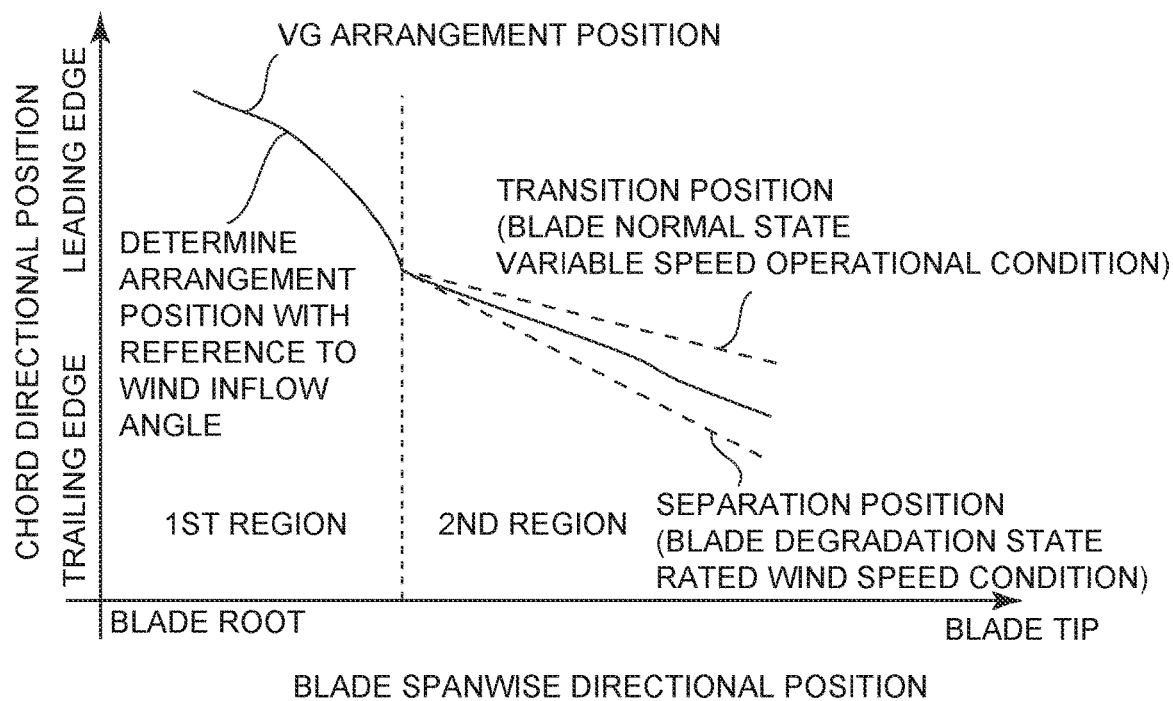
FIG. 12 is a graph showing an arrangement position of a vortex generator in the first region and the second region according to an embodiment.

Next, a method for determining an arrangement position of the vortex generator 10 on the wind turbine blade 2 according to some embodiments will be described in detail with reference to FIGS. 2 and 12. FIG. 12 is a graph showing an arrangement position of the vortex generator 10 in the first region and the second region according to an embodiment.

In some embodiments, as shown in FIG. 2A, provided that the mounting range 100 of the vortex generator 10 includes the first region M and the second region N closer to the blade tip than the first region M with respect to the blade spanwise direction, the arrangement position of the vortex generator 10 is determined by a method suitable for each region (M, N).

The method for determining an arrangement position of the vortex generator 10 in each of the first region M and the second region N will be described in detail. First, the mounting range 100 of the vortex generator 10 including the first region M and the second region N will be described in detail.

In an embodiment, as shown in FIG. 2A for example, the end portion on the blade root side of the mounting range 100 is positioned at a distance $L_1$ from the blade root 3. The value of $L_1$ is, using the blade length L of the wind turbine blade 2, not smaller than 0.05 L.

In this case, the vortex generator 10 is disposed in the mounting range 100 being a region closer to the blade tip than the 5% position of the blade length L from the blade root 3, where contribution to the output of the wind turbine power generating apparatus 90 can be expected. In this way, it is possible to gain the technical benefit of the vortex generator 10 effectively while reducing the installation cost of the vortex generator 10.

Figure 2B:
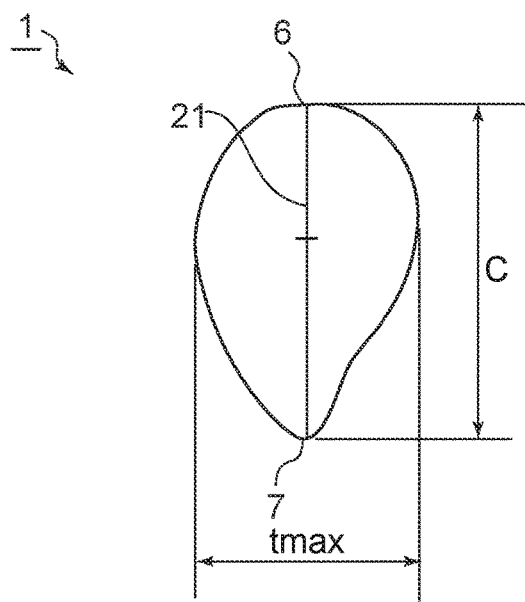
FIG. 2B is a cross sectional view of a wind turbine blade assembly shown in FIG. 2A.

FIG. 2B is a cross-sectional view of a blade in a blade spanwise direction. In an embodiment, the first region M is set to be a region where the maximum blade thickness ratio tmax/C, which is a ratio of the maximum blade thickness tmax to the chord length C, is not less than 60%.

As described below, in the first region M, the angular position of the vortex generator 10 is determined with reference to the inflow angle of wind to the wind turbine blade 2. Thus, with the first region M being set to be a region where the maximum blade thickness ratio tmax/C is not less than 60%, it is possible to achieve, with the vortex generator 10, a high effect to improve the lift-to-drag ratio in the first region M, where the maximum blade thickness ratio is high and it is difficult to predict the transition position and the separation position accurately.

The mounting range 100 of the vortex generator 10 may include a region other than the first region M and the second region N determined as described above. For instance, the first region M and the second region N do not necessarily be disposed next to each other as shown in FIGS. 2A and 7, and a third region may be interposed between the first region M and the second region N. In an embodiment, arrangement position of the vortex generator 10 in the third region may be determined to be on a line connecting the arrangement position of the first region at an end portion closer to the blade tip and the arrangement position of the second region at an end portion closer to the blade root. The mounting range 100 of the vortex generator 10 may include another region on the blade root side of the first region M or the blade tip side of the second region N.

(VG Arrangement Position in the First Region M)

Figure 13A:
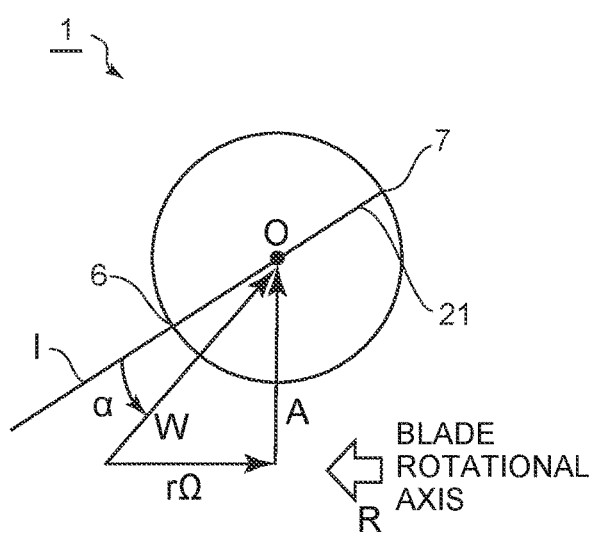
FIG. 13A is a cross sectional view of the wind turbine blade in the first region.
Figure 13B:
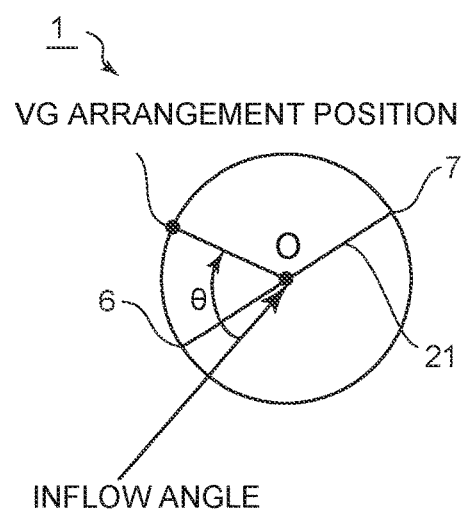
FIG. 13B is a diagram showing an arrangement angle of a vortex generator in the first region according to an embodiment.

A method for determining an arrangement position of the vortex generator 10 in the first region according to some embodiments will be described with reference to FIGS. 13A and 13B. FIGS. 13A and 13B are each a cross sectional view of the wind turbine blade 2 in the first region M. The wind turbine blade 2 in the first region M includes a leading edge 6, a trailing edge 7, and a chord 21.

In FIG. 13A, the relative wind velocity vector W is a velocity vector of wind relative to the wind turbine blade 2 that rotates in the blade rotational direction R, and is a sum of the velocity vector A of wind coming in a direction perpendicular to the rotational direction of the wind turbine blade 2 and the tip speed vector $r\Omega$ of the wind turbine blade 2. Further, the angular degree $\alpha$ between the relative wind velocity vector W and the extension line '1' of the chord 21 of the wind turbine blade 2 is the attack angle of the wind turbine blade 2.

As shown in FIG. 13B, in the first region M, the direction of the relative wind velocity vector W is regarded as the inflow angle of wind, and is referred to as the reference (zero degree). Furthermore, the angular position on the blade surface offset by a predetermined angle $\theta$ from the inflow angle toward the trailing edge 7 is determined to be the arrangement position of the vortex generator 10.

Furthermore, in FIGS. 13A, 13B, the origin O, which is the reference of vectors and angles, is positioned at the center axis (pitch axis) of the blade root 3 of the wind turbine blade 2. The blade root 3 of the wind turbine blade 2 has a cylindrical shape, and the position of the center axis of the cylindrical shape (origin O) can be unambiguously defined on a cross section of the wind turbine blade 2 at each blade spanwise directional position.

In this case, in the first region M having an airfoil such that the blade thickness ratio is relatively high compared to the second region N on the blade tip side and it is difficult to predict the transition position and the separation position accurately, it is possible to determine the arrangement position of the vortex generator 10 precisely on the surface of the wind turbine blade 2.

In an embodiment, the arrangement angle $\theta$ of the vortex generator 10 is not smaller than 60 degrees and not greater than 90 degrees.

According to findings of the present inventors, in the first region M where the blade thickness ratio is relatively high compared to the second region on the blade tip side, when the arrangement angle $\theta$ of the vortex generator 10 is set to approximately 60 degrees to 90 degrees, it is possible to achieve a high effect to improve the lift-to-drag ratio with the vortex generator 10.

In an embodiment, the arrangement position of the vortex generator 10 may be the separation position of a flow along the blade surface based on numerical calculation. At this time, the numerical calculation may be performed by using CFD, or the viscous-inviscid interaction method described below.

In this case, when obtaining the separation position by numerical calculation, the blade degradation state may be modeled by the turbulence transition position of the boundary layer. That is, while analysis of the turbulence transition position (transition point analysis) and analysis of flow are performed at the same time in the blade normal state, in the blade degradation state, analysis may be performed on the premise that turbulence transition occurs at the leading edge of the blade. Furthermore, the operational condition of the wind turbine (variable speed operation condition or rated wind speed condition) may be reproduced by specifying wind velocity, rotation speed, attack angle, and the like for the operational state of the wind turbine.

(VG Arrangement Position in the Second Region N)

Figure 14A:
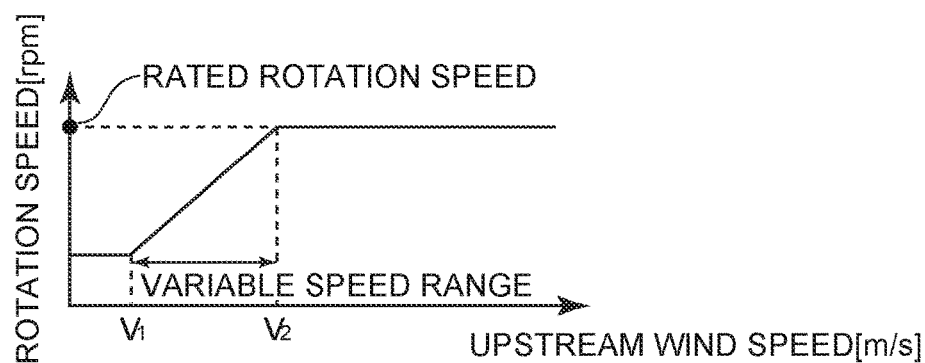
FIGS. 14A to 14D are diagrams showing general operation conditions of a wind turbine.
Figure 14B:
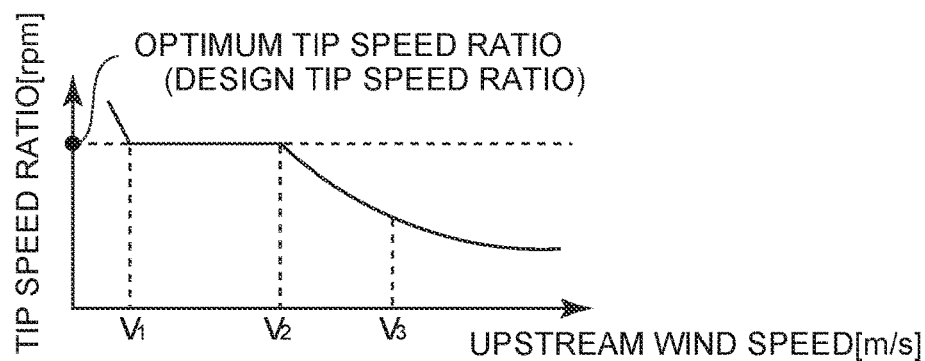
Figure 14C:
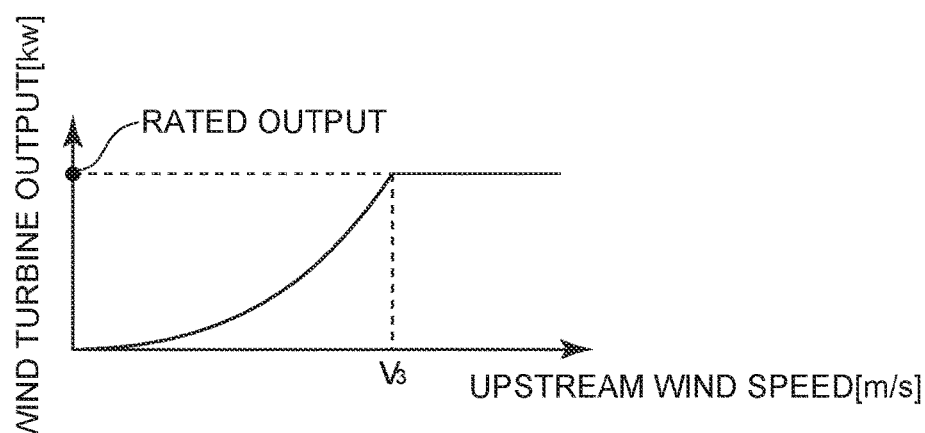
Figure 14D:
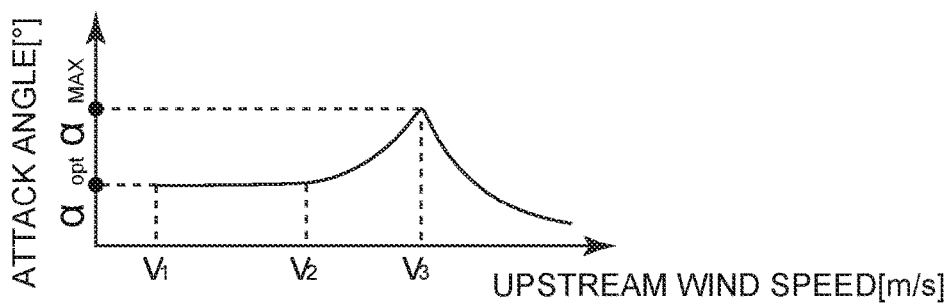
Figure 15A:
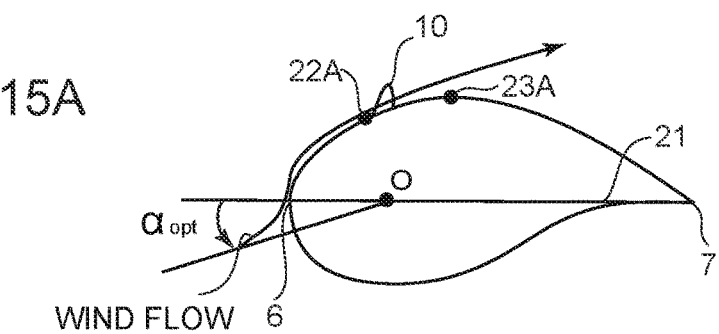
FIGS. 15A and 15B are cross-sectional diagrams of a wind turbine blade assembly according to an embodiment.
Figure 15B:
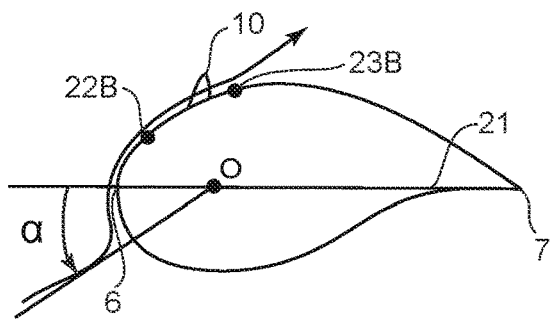

A method for determining an arrangement position of the vortex generator 10 in the second region N according to some embodiments will be described with reference to FIGS. 12, 14, 15A and 15B. FIG. 14 is a graph showing an operational condition of a general wind turbine. FIG. 15A shows the cross section of the blade and a flow along the blade surface, under a variable speed operation condition in the second region N according to some embodiments. FIG. 15B shows the cross section of the blade and a flow along the blade surface, under a rated speed operation condition in the second region N according to some embodiments.

First, with reference to FIG. 14, an operational condition of a general wind turbine will be described. FIG. 14A is a graph showing a relationship between upstream wind velocity and rotation speed of a wind turbine. FIG. 14B is a graph showing a relationship between upstream wind velocity and tip speed ratio. FIG. 14C is a graph showing a relationship between upstream wind velocity and wind turbine output. FIG. 14D is a graph showing a relationship between upstream wind velocity and attack angle.

A general wind turbine operates at a constant rotation speed once the wind speed reaches the cut-in wind speed ($<V_1$), and the tip speed ratio decreases as the wind speed increases while the rotation speed stays constant. Further, after the wind speed reaches the wind speed $V_1$ at which the tip speed ratio is equal to the optimum value (the tip speed ratio is the optimum tip speed ratio) or higher, and until the wind speed reaches the wind speed $V_2$ reaching the rated rotation speed, the wind turbine operates at a substantially constant tip speed ratio (optimum tip speed ratio or design tip speed ratio) at which the performance (efficiency) is optimum (maximum) (see FIG. 14B). Herein, the tip speed ratio is represented as (blade tip speed [m/s])/(upstream wind speed [m/s]) by using the wind speed (upstream wind speed) at the infinite upstream side that is not affected by presence of the wind turbine blade. In the variable speed range where the wind speed reaches $V_1$ to the rated rotation speed, the tip speed vector $r\Omega$ changes in accordance with a change in the velocity vector of wind so that the tip speed ratio is maintained at the optimum tip speed ratio (design speed ratio), and the attack angle $\alpha$ is maintained at a substantially constant value suitable for the wind turbine blade (=optimum attack angle $\alpha_{opt}$) (see FIGS. 14B and 14D).

In this regard, after the wind speed reaches the wind speed $V_2$ of reaching the rated rotation speed, the rotation speed is maintained at a constant value (rated rotation speed), and thus the tip speed vector $r\Omega$ is maintained substantially at a constant magnitude. Thus, in the high wind speed region between the wind speed $V_2$ reaching the rated rotation speed and the wind speed $V_3$ reaching the rated output, when the wind speed increases, only the velocity vector A of wind increases while the tip speed vector $r\Omega$ is maintained at a constant value, and the attack angle α of the wind turbine blade increases (see FIG. 14D). The increasing trend of the attack angle α continues to the wind speed (rated wind speed) $V_3$ at which the wind turbine output reaches the rated output. Further, after reaching the rated wind speed $V_3$, the attack angle α is reduced by the pitch control of the wind turbine blade, and the wind turbine output is maintained at a constant value. Further, the pitch control may be performed between $V_2$ and $V_3$, unlike each condition shown in FIG. 14.

Accordingly, the attack angle α under the rated wind speed condition (wind speed $V_3$) is greater than the attack angle $α_{opt}$ under a variable speed operation condition of the wind turbine (wind speed $V_1$ to $V_2$). That is, the attack angle α in FIG. 15B showing a state under a rated wind speed condition is greater than the attack angle α (optimum attack angle $α_{opt}$) in FIG. 15A showing a state under a variable speed operation condition.

If the attack angle α is relatively large (see FIG. 15B), the transition position and the separation position of a flow along the blade surface shifts toward the leading edge 6 of the wind turbine blade 2, compared to a case in which the attack angle α is small (see FIG. 15A).

As clearly shown in comparison of FIGS. 15A and 15B, under the rated wind speed condition (FIG. 15B), the attack angle α is relatively large, and thus wind enters from a direction closer to the pressure surface compared to FIG. 15A. Thus, the transition position 22B and the separation position 23B under the rated wind speed condition shifts toward the leading edge compared to the transition position 22A and the separation position 23A under the variable speed operation condition.

Thus, in some embodiments, as shown in FIG. 15A, the arrangement position of the vortex generator 10 in the second region N is determined to be a position closer to the trailing edge than the transition position 22A under the variable speed operation condition. Furthermore, the arrangement position of the vortex generator 10 in the second region N is determined to be a position closer to the leading edge than the separation position 23B under the rated speed operation condition.

According to the above described embodiment, it is possible to determine an arrangement position of the vortex generator at a suitable position taking into account the difference in attack angle between the variable speed operation condition and the rated wind speed condition, and thus it is possible to suppress separation of a flow along the surface of the wind turbine blade even in a case where the attack angle increases with an increase in the wind speed, after reaching the rated rotation speed. Furthermore, with the arrangement position of the vortex generator 10 being closer to the trailing edge than the transition position 22A under the variable speed operation condition in the blade normal state, under the variable speed operation condition under which drag penalty may increase drag, it is possible to reduce drag penalty due to provision of the vortex generator 10 while suppressing separation of a flow along the surface of the wind turbine blade 2.

Furthermore, typically, the surface of the wind turbine blade becomes less smooth due to degradation with age, and the roughness of the blade surface gradually increases. Thus, as compared to the blade normal state in which the blade surface is smooth, in the blade degradation state in which the roughness of the blade surface is relatively high, the transition position and the separation position of a flow along the blade surface is offset toward the leading edge. Thus, in some cases, it is desirable to determine the arrangement position of the vortex generator 10 in the second region N at a position capable of enjoying an aerodynamic effect of the vortex generator 10 not only in the blade normal state but also in the blade degradation state, taking into account the aging degradation of the surface of the wind turbine blade 2.

Thus, in an embodiment, as shown in FIG. 2, the arrangement position of the vortex generator 10 in the second region N is determined to be a position closer to the trailing edge than the transition position under the variable speed operation condition in the blade normal state. Furthermore, the arrangement position of the vortex generator 10 in the second region N is determined to be a position closer to the leading edge than the separation position under the rated speed operation condition in the blade degradation state.

According to the above described embodiment, the arrangement position of the vortex generator 10 is closer to the leading edge than the separation position 23B under the rated wind speed condition in the blade degradation state, and thereby it is possible to enjoy the effect of the vortex generator 10 to improve the lift-to-drag ratio, regardless of the degradation state of the wind turbine blade.

It should be noted that the transition position 22A under the variable speed operation condition and the separation position 23B under the rated wind speed condition may be obtained by the numerical calculation, and the numerical calculation method used therein may be performed by using CFD, or the viscous-inviscid interaction method described below.

The viscous-inviscid interaction method is for simply analyzing the performance of a two-dimensional airfoil, characterized in that the analysis time is extremely short compared to that of CFD. For instance, while CFD requires a couple of hours for analysis of one condition, the viscous-inviscid interaction method completes such an analysis in a couple of seconds.

The numeral calculation method using the viscous-inviscid interaction method will be described. In the viscous-inviscid interaction method, calculation is performed separately in a region where the viscosity is dominant (region in the vicinity of the blade or of blade wake) and in a region where the viscosity can be ignored (region away from the blade), and the speed and pressure distribution are obtained in each region. Specifically, a boundary layer equation is solved in a region where viscosity is dominant, and a potential equation ignoring viscosity is solved in a region where viscosity can be ignored. By combining analyses of two regions obtained as described above, it is possible to simulate an actual physical phenomenon.

Representative analysis results that can be obtained by the viscosity-inviscid interaction method includes, for instance, a pressure coefficient distribution on the blade surface, a friction coefficient distribution on the blade surface, a boundary layer thickness distribution on the blade surface, a lift coefficient of the blade, and a drag coefficient of the blade. From these analysis results, it is possible to evaluate the aerodynamic characteristics such as the transition position and the separation position, and the stall angle, in a blade cross section.

Furthermore, in a case where the separation position 23B under the rated wind speed condition is obtained by numeral calculation, numeral calculation may be performed under a condition such that the transition position 22B of a flow on the surface of the wind turbine blade 2 is fixed to the leading edge 6 of the wind turbine blade 2.

According to findings of the present inventors, the transition position 22B is close to the leading edge 6 under a rated wind speed condition in which the attack angle α is relatively large. Thus, by performing numeral calculation under a condition such that the transition position 22B is fixed to the leading edge 6, it is possible to perform determination of the arrangement position of the vortex generator 10 efficiently.

Next, a mounting range and an arrangement position of the vortex generator 10 according to some embodiments will be described with reference to FIGS. 16 to 19.

Figure 16:
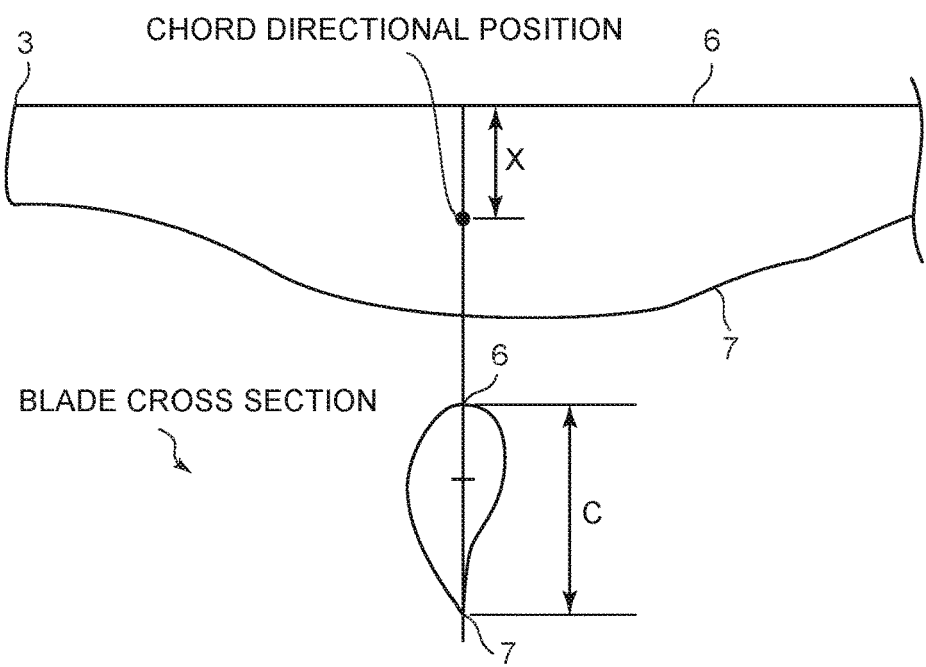
FIG. 16 is a planar view and a cross-sectional view of a wind turbine blade according to an embodiment.

In some embodiments, in a blade spanwise directional position in the mounting range, the arrangement position of the vortex generator 10 is determined such that a ratio x/C of a chordwise directional position x from the leading edge to the chord length C is not greater than 50%. The chordwise directional position x in FIG. 16 is a position coordinate, in the chordwise direction, of a point on the blade surface, where the leading edge 6 is the origin.

Figure 17:
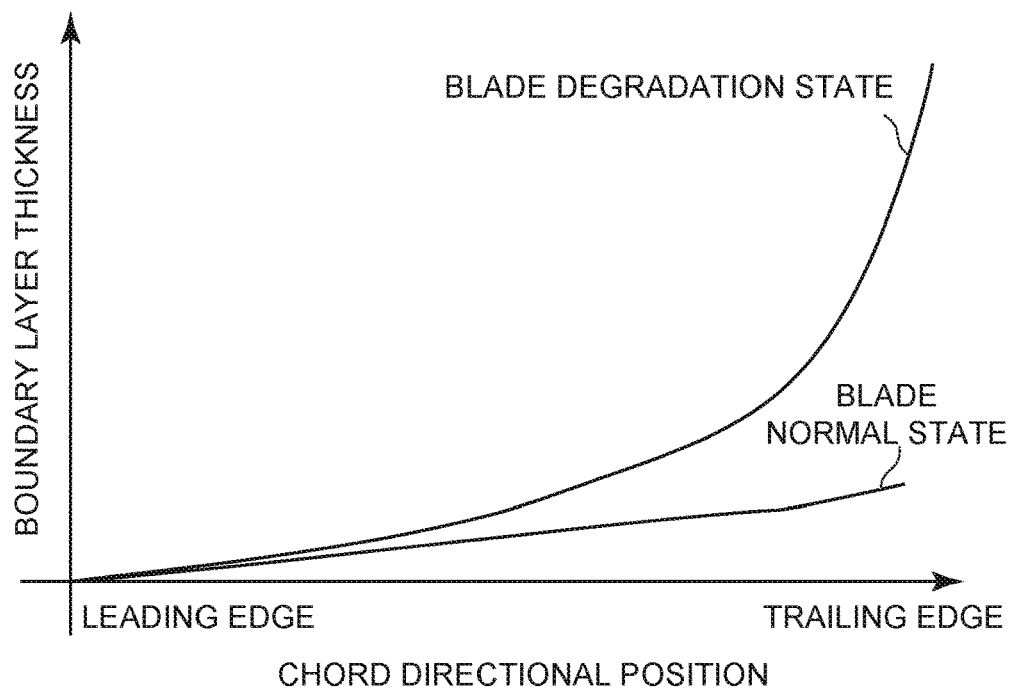
FIG. 17 is a graph showing a relationship between the chordwise directional position and the boundary layer thickness.

The dimension of the vortex generator 10 is normally set in accordance with the boundary layer thickness. That is, a desirable height of a fin of the vortex generator 10 is a height that does not cause drag penalty, while covering the boundary layer thickness. FIG. 17 is a graph showing the boundary thickness layer in the chordwise direction, in the blade degradation state and the blade normal state. According to FIG. 17, the boundary layer thickness varies considerably toward the trailing edge 7, between the blade degradation state and the blade normal state. Thus, even if the vortex generator 10 has a dimension suitable for the blade degradation state at the trailing edge side, the dimension considerably exceeds the boundary layer thickness in the blade normal state. Accordingly, the drag of the vortex generator 10 itself increases, and drag penalty occurs. In contrast, even if the vortex generator 10 has a dimension suitable for the blade normal state at the trailing edge side, the thickness is smaller than the boundary layer thickness in the blade degradation state. Accordingly, the effect to suppress separation decreases in the blade degradation state.

According to findings of the present inventors, with the limit on the side of the trailing edge of the arrangement position of the vortex generator 10 along the chordwise direction being 50% from the leading edge, it is possible to reduce drag penalty caused by provision of the vortex generator 10, while suppressing separation of a flow along the surface of the wind turbine blade, in both of the blade degradation state and the blade normal state.

Figure 18A:
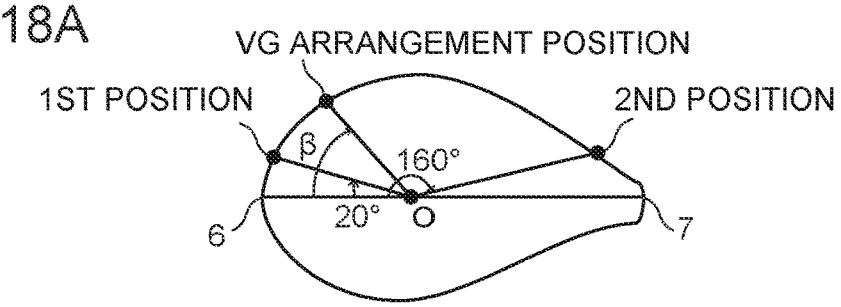
FIGS. 18A and 18B are cross-sectional diagrams of a wind turbine blade according to an embodiment.
Figure 18B:
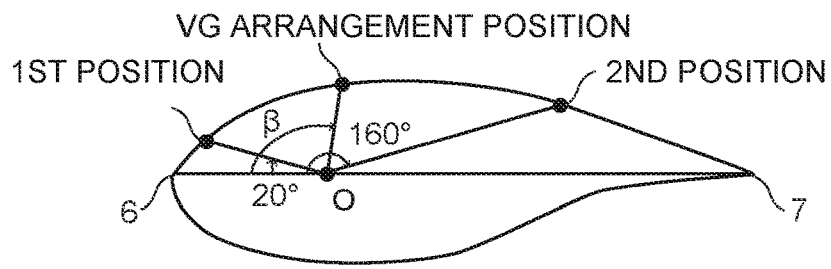

FIG. 18A is a cross-sectional view of the blade root side, and FIG. 18B is a cross-sectional view of the blade tip side. In some embodiments, as shown in FIGS. 18A and 18B, in a blade spanwise directional position in the mounting range, the angular range for mounting the vortex generator is determined in an angular range between the first position on the suction surface of the wind turbine blade offset by 20 degrees toward the trailing edge with reference to the leading edge and the second position on the suction surface offset by 160 degrees toward the trailing edge with reference to the leading edge. Further, the arrangement position of the vortex generator is determined such that the mounting angle β with reference to the leading edge increases toward the blade tip side.

Figure 19:
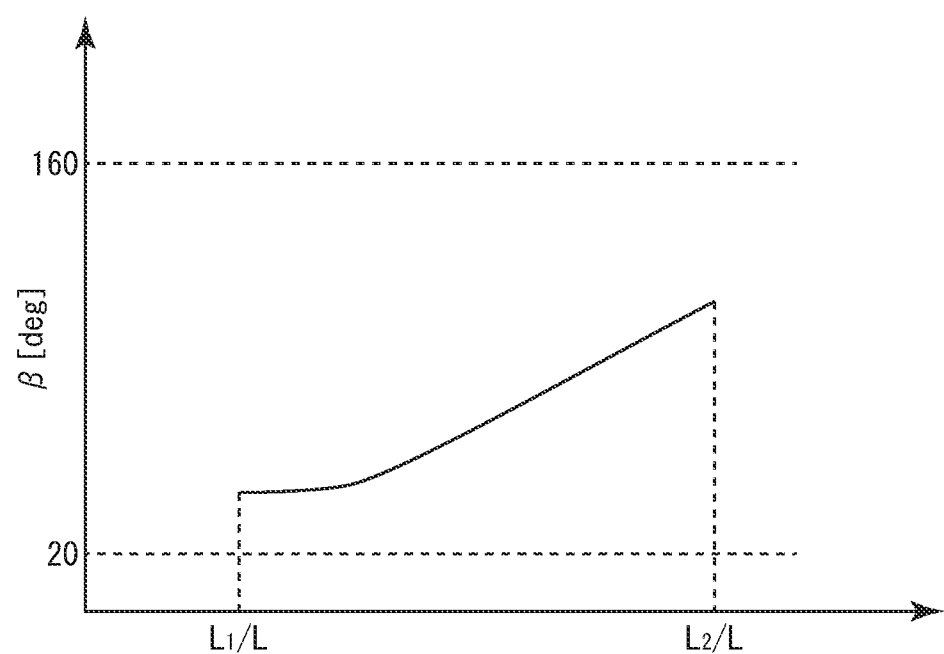
FIG. 19 is a graph showing a relationship between the radial directional position from the blade root and the mounting angle according to an embodiment.

Accordingly, the mounting angle of the vortex generator 10 with reference to the leading edge increases toward the blade tip, and thus it is possible to realize an appropriate arrangement of the vortex generator 10 taking into account the changing trend of the attack angle with respect to the blade spanwise directional position (i.e., the trend of the attack angle to decrease toward the blade tip). Furthermore, by setting the mounting angle of the vortex generator 10 with reference to the leading edge in the above numerical range (not smaller than 20 degrees and not greater than 160 degrees with reference to the leading edge), it is possible to achieve a high lift-to-drag ratio. FIG. 19 is a graph showing a relationship between the radial directional position from the blade root and the mounting angle according to an embodiment.

With the above configuration, it is possible to suppress occurrence of drag penalty caused by mounting a vortex generator.

Embodiments of the present invention were described in detail above, but the present invention is not limited thereto, and various amendments and modifications may be implemented.

The invention claimed is:

1. A wind turbine blade comprising a vortex generator including a plurality of fins, wherein
the plurality of fins include
at least one first fin disposed in a mounting range of zero to 0.1 R with respect to a radius R of a rotor including the wind turbine blade and a hub to which the wind turbine blade is configured to be mounted, the radius R of the rotor being measured from a center of the hub, such that a ratio x/C of a chordwise directional position x of the at least one first fin to a chord length C satisfies 0≤x/C≤0.2; and
at least one second fin disposed in a mounting range of 0.15 to 0.2R, such that a ratio x/C of a chordwise directional position x of the at least one second fin to the chord length C satisfies 0.2≤x/C≤0.8,
wherein the at least one second fin includes an outermost fin positioned closest to a blade tip among the plurality of fins and disposed closer to a blade root than a radial directional position of 0.2R,
wherein the outermost fin of the plurality of fins is the outermost fin of the blade, and the outermost fin is a rearmost fin along the chord length.

2. The wind turbine blade according to claim 1,
wherein the vortex generator includes a plurality of fin sets each of which is formed by a pair of fins each having a pressure surface and a suction surface, the fins being arranged such that the suction surfaces face each other, and
wherein, in the mounting range, a ratio z/s of an arrangement pitch 'z' of adjacent fin sets of the plurality of fin sets to an interval 's' between trailing edges of the pair of fins satisfies 1.5≤z/s≤3.0.

3. The wind turbine blade according to claim 1,
wherein the vortex generator includes a plurality of fin sets each of which is formed by a pair of fins arranged such that suction surfaces face each other, and a ratio s/h of an interval 's' between trailing edges of the pair of fins to a height 'h' of the fins satisfies 2.5≤s/h≤5.0.

4. The wind turbine blade according to claim 1,
wherein the vortex generator includes a pair of fins arranged line-symmetrically with respect to a segment along a chordwise direction of the wind turbine blade.

5. The wind turbine blade according to claim 1,
wherein the vortex generator includes a pair of fins arranged closer to the blade root than a starting point of a flat back of the wind turbine blade.

6. The wind turbine blade according to claim 1,
wherein the vortex generator includes a plurality of fin sets each of which is formed by a pair of fins each having a pressure surface and a suction surface, the fins being arranged such that the suction surfaces face each other, and wherein a ratio z/h of an arrangement pitch 'z' of adjacent fin sets of the plurality of fin sets to a height 'h' of the fins is not smaller than 6.0 and not greater than 8.0.

7. The wind turbine blade according to claim 1, wherein a blade length L of the wind turbine blade satisfies L≥55 m.

8. The wind turbine blade according to claim 1, wherein the vortex generator is disposed within a range where a blade thickness ratio is higher than $2\times(t/c)_{ref}$, provided that $(t/c)_{ref}$ is a blade thickness ratio at a position where a ratio r/R of a blade spanwise directional position 'r' to a radius R of the rotor is 0.8.

9. The wind turbine blade according to claim 1, wherein the vortex generator is disposed in a range where a blade thickness ratio is not greater than $3\times(t/c)_{ref}$, provided that $(t/c)_{ref}$ is a blade thickness ratio at a position where a ratio r/R of a blade spanwise directional position 'r' to a radius R of the rotor is 0.8.

10. The wind turbine blade according to claim 1, wherein the radial directional position of 0.2R is closer to the blade root than a blade spanwise directional position at which a ratio t/C of a blade thickness 't' to the chord length C is 0.4.

11. The wind turbine blade according to claim 1, wherein the plurality of fins including the outermost fin is arranged such that a value of the ratio x/C linearly increases with a dimensionless radial position r/R.

12. A method for fabricating or retrofitting a wind turbine blade having a vortex generator including a plurality of fins, the method comprising:
   determining arrangement of the plurality of fins; and
   mounting the plurality of fins on the wind turbine blade with the determined arrangement,
   wherein, in the determined arrangement, the plurality of fins includes:
      at least one first fin disposed in a mounting range of zero to 0.1 R with respect to a radius R of a rotor including the wind turbine blade and a hub to which the wind turbine blade is configured to be mounted, the radius R of the rotor being measured from a center of the hub, such that a ratio x/C of a chordwise directional position x of the at least one first fin to a chord length C satisfies 0≤x/C≤0.2; and
      at least one second fin disposed in a mounting range of 0.15 to 0.2R, such that a ratio x/C of a chordwise directional position x of the at least one second fin to the chord length C satisfies 0.2≤x/C≤0.8,
   wherein the arrangement of the plurality of fins is determined such that the at least one second fin includes an outermost fin positioned closest to a blade tip among the plurality of fins and disposed closer to a blade root than a radial directional position of 0.2R,
   wherein the outermost fin of the plurality of fins is the outermost fin of the blade, and the outermost fin is a rearmost fin along the chord length.

13. The method for fabricating or retrofitting the wind turbine blade having the vortex generator according to claim 12, comprising:
   a first step of determining arrangement of the vortex generator at an angular position offset by a predetermined angle toward a trailing edge of the wind turbine blade, with reference to an inflow angle of wind to the wind turbine blade, in a first region, in a blade spanwise direction, of a mounting range of the vortex generator on the wind turbine blade;
   a second step of determining an arrangement position of the vortex generator between a separation position of a flow on a surface of the wind turbine blade under a rated wind speed condition and a transition position of a flow on the surface of the wind turbine blade under a variable speed operation condition of a wind turbine which includes the wind turbine blade, in a second region closer to a blade tip than the first region, of the mounting range; and
   a third step of determining the arrangement position of the vortex generator by connecting arrangements in the first step and the second step.

14. A wind turbine blade comprising a vortex generator including a plurality of fins, wherein
   the plurality of fins include
      at least one first fin disposed in a mounting range of zero to 0.1 R with respect to a radius R of a rotor including the wind turbine blade and a hub to which the wind turbine blade is configured to be mounted, the radius R of the rotor being measured from a center of the hub, such that a ratio x/C of a chordwise directional position x of the at least one first fin to a chord length C satisfies 0≤x/C≤0.2; and
      at least one second fin disposed in a mounting range of 0.15 to 0.2R, such that a ratio x/C of a chordwise directional position x of the at least one second fin to the chord length C satisfies 0.2≤x/C≤0.8,
   wherein the at least one second fin includes an outermost fin positioned closest to a blade tip among the plurality of fins and disposed closer to a blade root than a radial directional position of 0.2R,
   wherein the outermost fin of the plurality of fins is the outermost fin of the blade, and
   wherein the plurality of fins satisfy at least one of the following conditions:
      (a) the ratio x/C is in the range 0 and 0.8 for all fins over the blade,
      (b) the plurality of fins is in a curvilinear or linear arrangement, or
      (c) the plurality of fins is arranged in a single row.

\* \* \* \* \*